(12) United States Patent
Omino

(10) Patent No.: US 8,111,708 B2
(45) Date of Patent: Feb. 7, 2012

(54) DISTRIBUTED PROCESSING SYSTEM, METHOD OF DISTRIBUTED PROCESSING, TERMINALS AND STORAGE MEDIA

(75) Inventor: Takayuki Omino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/043,779

(22) Filed: Mar. 9, 2011

(65) Prior Publication Data

US 2011/0185003 A1 Jul. 28, 2011

Related U.S. Application Data

(63) Continuation of application No. 12/203,766, filed on Sep. 3, 2008, now Pat. No. 7,929,561.

(30) Foreign Application Priority Data

Sep. 4, 2007 (JP) ................................. 2007-229336

(51) Int. Cl.
*H04L 12/28* (2006.01)
(52) U.S. Cl. ........................................ 370/419; 370/473
(58) Field of Classification Search .................. 370/389, 370/401, 408, 413, 419–421, 473
See application file for complete search history.

(56) References Cited

U.S. PATENT DOCUMENTS

| | | | |
|---|---|---|---|
| 5,425,023 A | 6/1995 | Haraguchi et al. | |
| 6,721,334 B1 | 4/2004 | Ketcham | |
| 6,842,446 B2 | 1/2005 | Everson et al. | |
| 6,968,192 B2 * | 11/2005 | Longoni | 455/453 |
| 7,577,620 B1 | 8/2009 | Donner | |
| 7,729,293 B2 | 6/2010 | Suzuki et al. | |
| 2007/0223472 A1 | 9/2007 | Tachibana et al. | |
| 2008/0080371 A1 | 4/2008 | Liu et al. | |
| 2008/0225735 A1 | 9/2008 | Qiu et al. | |
| 2010/0067533 A1 | 3/2010 | Yoshida et al. | |

FOREIGN PATENT DOCUMENTS

| | | |
|---|---|---|
| JP | 2000242614 A | 9/2000 |
| JP | 2004164255 A | 6/2004 |

* cited by examiner

*Primary Examiner* — Ayaz Sheikh
*Assistant Examiner* — Mounir Moutaouakil
(74) *Attorney, Agent, or Firm* — Sughrue Mion, PLLC

(57) ABSTRACT

A distributed processing system includes a first information processing device, two or more second information processing devices connected with the first information processing device via a first network, and the second information processing devices being connected with each other via a second network, wherein the first information processing device includes an input division unit that generates divided input data pieces by dividing an input data set, and a divided input distribution unit that transmits the divided input data pieces to the second information processing devices, and wherein the second information processing devices include a divided input transfer unit that transmits the divided input data piece to the second information processing device assigned as the base terminal from one or more of the second information processing devices assigned as a client terminal, and a divided input combining unit that combines the divided input data pieces to restore the input data set.

19 Claims, 15 Drawing Sheets

Fig.6A

620 WIRELESS TERMINAL SPECIFICATION INFORMATION

630 WIRELESS TERMINAL SPECIFICATION MANAGEMENT TABLE

| 621 | 632 | 633 | 634 | 635 | 636 | 637 | 622 | 623 | 624 | 625 | 626 | 627 | 628 |
|---|---|---|---|---|---|---|---|---|---|---|---|---|---|
| WIRELESS TERMINAL IDENTIFICATION NUMBER | DEVICE TYPE | PRODUCT MODEL NUMBER | CPU PERFORMANCE | MEMORY CAPACITY | STORAGE (FREE SPACE/TOTAL) SIZE | COMMUNICATION RATE | TELEPHONE OFF AVAILABILITY | TERMINAL LOCATION | RADIO WAVE STATUS | BASE TERMINAL /CLIENT TERMINAL | DIVISION BLOCK | COMPUTATION PROCESSING COMPLETION RATIO | REMAINING COMPUTATION PROCESSING TIME |
| 00001 | | | | | | | | | | | | | |
| 00002 | | | | | | | | | | | | | |
| 00003 | | | | | | | | | | | | | |
| 00004 | | | | | | | | | | | | | |
| ... | | | | | | | | | | | | | |

Fig.6B

620 WIRELESS TERMINAL SPECIFICATION INFORMATION

630 WIRELESS TERMINAL SPECIFICATION MANAGEMENT TABLE

| 621 | 632 | 633 | 634 | 635 | 636 | 637 | 622 | 623 | 624 | 625 | 626 | 627 | 628 |
|---|---|---|---|---|---|---|---|---|---|---|---|---|---|
| WIRELESS TERMINAL IDENTIFICATION NUMBER | DEVICE TYPE | PRODUCT MODEL NUMBER | CPU PERFORMANCE | MEMORY CAPACITY | STORAGE (FREE SPACE/TOTAL) SIZE | COMMUNICATION RATE | TELEPHONE OFF AVAILABILITY | TERMINAL LOCATION | RADIO WAVE STATUS | BASE TERMINAL /CLIENT TERMINAL | DIVISION BLOCK | COMPUTATION PROCESSING COMPLETION RATIO | REMAINING COMPUTATION PROCESSING TIME |
| 00001 | MOBILE PHONE | NC500iL | 4Ghz | 1GB | 200MB /500MB | 1Mbps | AVAILABLE | 14540285 63645829 | GOOD | BASE | 1 | 20% | 30 MIN. |
| 00002 | MOBILE PHONE | N1000iL | 1Ghz | 512MG | 100MB /200MB | 2Mbps | AVAILABLE | 14540285 63645830 | GOOD | CLIENT | 1 | | |
| 00003 | SMART PHONE | NL1000CA | 1Ghz | 1GB | 250MB /300MB | 2Mbps | UNAVAILABLE | 14540284 63645828 | FAIR | CLIENT | 1 | | |
| 00004 | MOBILE PHONE | NC600iL | 4Ghz | 1GB | 250MB /500MB | 2Mbps | AVAILABLE | 14540270 63645867 | FAIR | | | | |
| ... | ... | ... | ... | ... | ... | ... | ... | ... | ... | ... | ... | ... | ... |

840 OUTPUT DATA SET

842 DIVIDED OUTPUT DATA PIECE IDENTIFIER

841 DIVIDED OUTPUT DATA PIECE (841A)

842 DIVIDED OUTPUT DATA PIECE IDENTIFIER

841 DIVIDED OUTPUT DATA PIECE (841B)

842 DIVIDED OUTPUT DATA PIECE IDENTIFIER

841 DIVIDED OUTPUT DATA PIECE (841C)

DISTRIBUTED PROCESSING SYSTEM, METHOD OF DISTRIBUTED PROCESSING, TERMINALS AND STORAGE MEDIA

This is a Continuation of application Ser. No. 12/203,766 filed Sep. 3, 2008, claiming the benefit of priority from Japanese patent application No. 2007-229336, filed on Sep. 4, 2007, the disclosure of which is incorporated herein in its entirety by reference.

TECHNICAL FIELD

The present invention relates to a distributed processing system, the method of distributed processing, terminals and storage media, and particularly, relates to a distributed processing system using a terminal, the method of distributed processing, terminals and storage media.

BACKGROUND ART

Processing science-technology-based calculations and simulations by a computer require enormous amount of calculations. In a method called distributed computing, distributed system, or the like, the processing is divided into small processing units.

The divided processing units are then processed in a distributed manner by personal computers and servers that are connected to a network during idle time.

An example of such method is described in Japanese Patent Application Publication No. 2004-164255. This computation system is generally configured of a server connected to a network and a mobile phone as a client (a user mobile phone, or a portable terminal). The server has a server application and an information processor such as a workstation. The mobile phone has an agent including communication function and client software including a job execution program.

This computation system operates in the following manner. The server divides computer processing into processing units of predetermined size and distributes the processing units in response to requests from clients. The multiple clients process the processing units by use of the client software and transmit the processed units to the server. The server manages progress statuses, including the transmission status of the units to be processed and reception status of processed units, and processing purposes, and combines the received units that have been processed to create a process-completed unit.

Japanese Patent Application Publication No. 2000-242614 describes a method of achieving distributed processing by multiple CPUs tightly combined to each other through a network.

SUMMARY

An exemplary object of the invention is to provide a distributed processing technique to enable effective execution of mathematical computations for the processing unit of which size reduction is difficult, by using low communication rate terminals.

A distributed processing system according to an exemplary aspect of the invention includes a first information processing device, and two or more second information processing devices connected with the first information processing device via a first network, the second information processing devices being connected with each other via a second network, wherein the first information processing device includes, an input division unit that generates two or more divided input data pieces by dividing an input data set to be distributed to one of the second information processing devices assigned as a base terminal, and a divided input distribution unit that transmits the divided input data pieces to the second information processing devices via the first network, and wherein the second information processing devices each include, a divided input transfer unit that receives the divided input data piece via the first network and transmits the divided input data piece via the second network to the second information processing device assigned as the base terminal, a divided input reception unit that receives the divided input data piece from one or more of the second information processing devices assigned as a client terminal via the second network, and a divided input combining unit that combines the divided input data pieces to restore the input data set.

A distributed processing system according to an exemplary aspect of the invention includes a first information processing device, and two or more second information processing devices connected with the first information processing device via a first network, the second information processing devices being connected with each other via a second network, wherein each of the second information processing devices include, an output division unit that divides an output data set to generate two or more divided output data pieces, a divided output returning unit that transmits the divided output data pieces via the second network to one or more of the second information processing device assigned as a client terminal, and a divided output transfer unit that receives the divided output data piece via the second network from one of the second information processing devices, assigned as a base terminal, and that transmits the divided output data piece via the first network, and wherein the first information processing device includes, a divided output reception unit that receives the divided output data pieces from the second information processing devices via the first network, and a divided output combining unit that combines the two or more divided output data pieces to restore the output data set.

A distributed processing method according to an exemplary aspect of the invention includes a first information processing device, generating two or more divided input data pieces by dividing input data set to be distributed to one of second information processing devices assigned as a base terminal, and transmitting the divided input data piece to the second information processing device via the first network, and one of the second information processing devices, receiving the divided input data piece via the first network, transmitting the divided input data piece to one of the second information processing devices, assigned as the base terminal via the second network, receiving the divided input data piece from one or more of the second information processing devices assigned as a client terminal via the second network, and combining the divided input data pieces to restore the input data set.

A distributed processing method according to an exemplary aspect of the invention includes one of second information processing devices generating two or more divided output data pieces by dividing output data set, and transmitting the divided output data pieces via a second network to one or more of the second information processing devices assigned as a client terminal, and one or more of the second information processing devices, receiving the divided output data piece from the second information processing device assigned as the base terminal via the second network and transmitting the divided output data piece via a first network, and a first information processing device, receiving the divided output data pieces from the second information processing devices via the first network, and combining the two or more divided output data pieces to restore the output data set.

A distributed processing method according to an exemplary aspect of the invention includes a terminal receiving a divided input data piece divided and transmitted to a first network by a server, and the terminal, if assigned as a client terminal transmitting the divided input data piece to a second network, and the terminal, if assigned as a base terminal receiving the divided input data pieces from the second network, and combining the divided input data pieces to restore the input data set.

A distributed processing method according to an exemplary aspect of the invention includes a terminal, if assigned as a base terminal generating two or more divided output data pieces by dividing an output data set, and transmitting the divided output data pieces to the second network, and the terminal, if assigned as a client terminal, receiving the divided output data piece from the second network, and transmitting the divided output data piece to the first network.

A terminal according to an exemplary aspect of the invention includes a divided input transfer unit that receives a divided input data piece divided and transmitted to a first network by a server and that transmits the divided input data piece to a second network if the terminal is assigned as a client terminal, a divided input reception units that receives the divided input data piece from the second network if the terminal is assigned as a base terminal and a divided input combining unit that combines the divided input data pieces to restore the input data set if the terminal is assigned as the base terminal.

A terminal according to an exemplary aspect of the invention includes an output division unit that divides output data set to generate two or more divided output data pieces if the terminal is assigned as a base terminal, a divided output returning unit that transmits the divided output data piece to the second network if the terminal is assigned as the base terminal; and a divided output transfer unit that receives the divided output data piece from the second network and transmits the divided output data piece to the first network if the terminal is assigned as a client terminal.

A program for making a computer process it as follows on a storage medium according to an exemplary aspect of the invention includes receiving a divided input data piece divided and transmitted by a server to a first network, transmitting the divided input data piece to a second network if the computer is assigned as a client terminal, receiving the divided input data pieces from the second network if the computer is assigned as a base terminal, and combining the divided input data pieces to restore the input data set if the computer is assigned as the base terminal.

A program for making a computer process it as follows on a storage medium according to an exemplary aspect of the invention includes generating two or more divided output data pieces by dividing an output data set if the computer is assigned as a base terminal, transmitting the divided output data pieces to a second network if the computer is assigned as the base terminal, and receiving the divided output data piece from the second network and transmitting the divided output data piece to the first network if the computer is assigned as a client terminal.

BRIEF DESCRIPTION OF THE DRAWINGS

Exemplary features and advantages of the present invention will become apparent from the following detailed description when taken with the accompanying drawings in which:

FIGS. 6A and 6B are drawings showing the structure of the use management table for wireless terminals in the second exemplary embodiment;

EXEMPLARY EMBODIMENT

The exemplary embodiment is detailed with reference to the drawings. This specification uses the following notation.

When one component has different roles in operation and needs to be described separately in the following description, a numeric is suffixed. For example, wireless terminal 300 will be cited as wireless terminal 300A, wireless terminal 300B, and so forth. In this case, a component name given to the referring drawing is also followed by a suffixed numeric in parenthesis.

In addition, the functions described in following exemplary embodiments and examples may be achieved either by hardware, software, or a combination of hardware and software.

Figure 1:
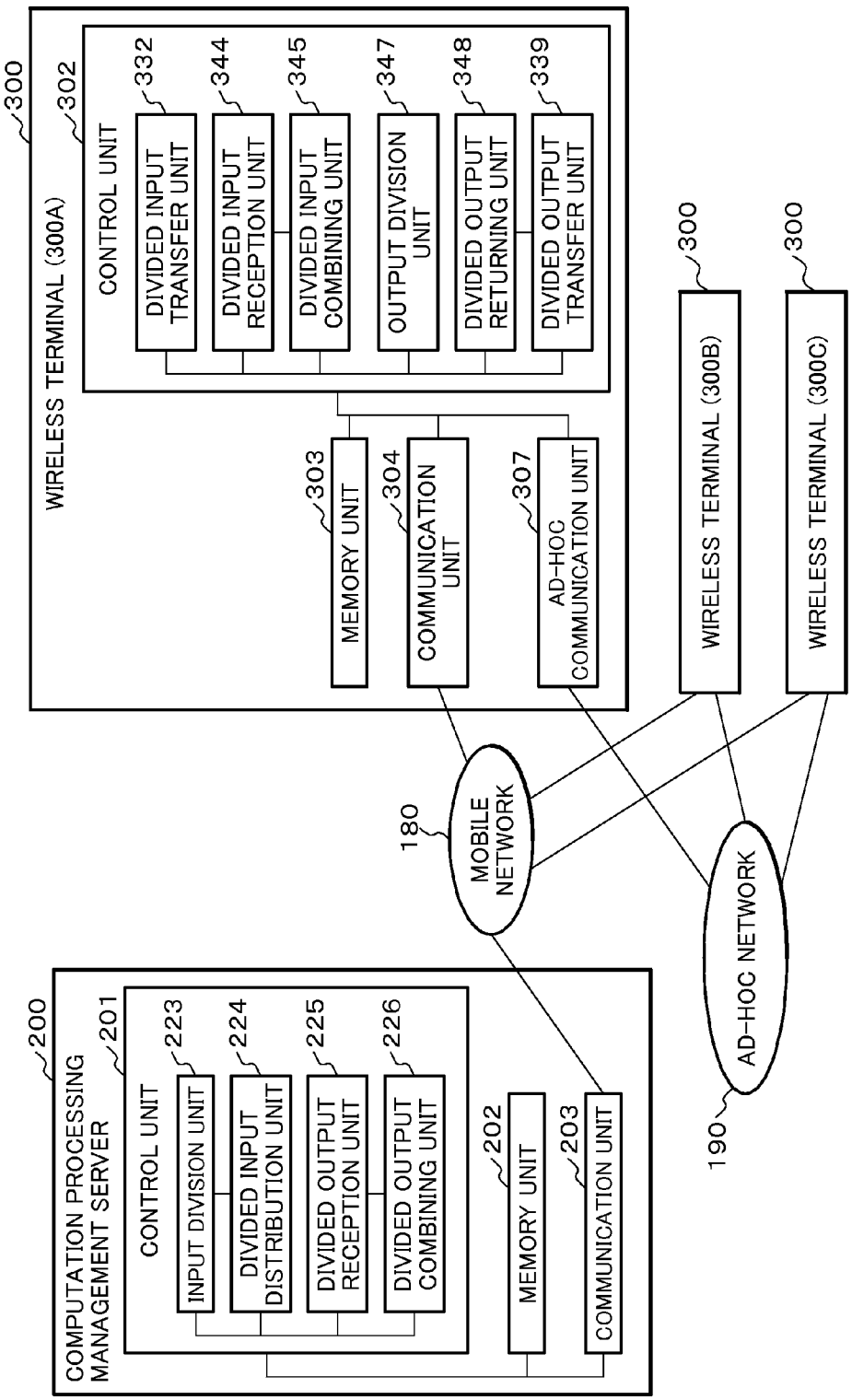
FIG. 1 is a block diagram showing the structure of the first exemplary embodiment.

The following is a description of a first exemplary embodiment. With reference to FIG. 1, the first exemplary embodiment includes computation processing management server 200, wireless terminal 300, mobile network 180 and ad-hoc network 190.

Computation processing management server 200 may also be called first information processor. Wireless terminal 300 may also be called second information processor. Mobile network 180 may also be called first network. Ad-hoc network 190 may also be called second network.

Mobile network 180 is, for example, a public phone line for wireless terminal 300 as a mobile phone. Ad-hoc network 190 complies with, for example, Bluetooth (a trademark of Bluetooth SIG, Inc. USA), IrDA (Infrared Data Association), or the like. This ad-hoc network 190 is capable of transferring data between wireless terminals 300 with better performance than mobile network 180. The performance is several to tens times of the mobile network 180.

Computation processing management server 200 has control unit 201, memory unit 202 and communication unit 203.

Wireless terminal 300 includes control unit 302, memory unit 303, communication unit 304 and ad-hoc communication unit 307.

Control unit 201 controls the operation of computation processing management server 200. Control unit 201 includes input division unit 223, divided input distribution unit 224, divided output reception unit 225 and divided output combining unit 226.

Memory unit 202 stores control information and data that are required for control unit 201 to control the operation of computation processing management server 200.

Communication unit 203 executes a communication when control unit 201 receives or transmits data from or to an external device via mobile network 180.

Control unit 302 controls the operation of wireless terminal 300. Control unit 302 includes divided input transfer unit 332, divided output transfer unit 339, divided input reception unit 344, divided input combining unit 345, output division unit 347 and divided output returning unit 348.

Memory unit 303 stores control information and data required for control unit 302 to control the operation of wireless terminal 300.

Communication unit 304 executes a communication when control unit 302 receives or transmits data from and to an external device via mobile network 180.

As mentioned above, each unit being included by control unit 201 and communication unit 203 executes transmission and reception of required data via communication unit 203, communication unit 304 and mobile network 180. The units will be described later.

In addition, each unit, to be described later, of control unit 302 transmits and receives required data via ad-hoc communication unit 307 and ad-hoc network 190.

To avoid redundancy, description is given of part of such operations that is not obvious to those skilled in the art.

For example, "Divided input distributing unit 224 transmits a divided input data piece to mobile network 180 by using communication unit 203. Divided input transfer unit 332 then receives the divided input data piece from mobile network 180 by using communication unit 304." will be described as follows. "Divided input distributing unit 224 transmits divided input data set to mobile network 180. Divided input transfer unit 332 receives the divided input data piece from mobile network 180." Description of communication unit 203 and communication unit 304 is omitted.

Input division unit 223 acquires input data set 810 from means that is not illustrated herein to divide the data into two or more divided input data pieces 811 with divided input data piece identifier 812 added. Divided input distribution unit 224 transmits divided input data piece 811 to mobile network 180.

Divided input data piece identifier 812 includes information to determine which wireless terminal 300 is to receive divided input data piece 811 when divided input transfer unit 332 transmits divided input data pieces 811 to ad-hoc network 190. In addition, divided input data piece identifier 812 includes information to determine the combining order when divided input combining unit 345 combines divided input data pieces 811.

Divided output reception unit 225 receives divided output data pieces 821 from mobile network 180. Divided output combining unit 226 combines divided output data pieces 821 by referring divided output data piece identifier 822 to restore output data set 820. The divided output data piece identifier 822 will be described later.

Divided input transfer unit 332 receives divided input data piece 811 from mobile network 180. Divided input transfer unit 332 then transmits divided input data piece 811 to ad-hoc network 190 based on divided input data piece identifier 812.

Divided output transfer unit 339 receives divided output data piece 821 from ad-hoc network 190. Divided output transfer unit 339 then transmits divided output data piece 821 to mobile network 180. Divided input reception unit 344 receives divided input data piece 811 from ad-hoc network 190. Divided input combining unit 345 combines divided input data pieces 811 based on divided input data piece identifier 812.

Output division unit 347 divides output data set 820 into two or more divided output data pieces 821 with divided output data piece identifier 822 added.

Divided output data piece identifier 822 includes information to determine which wireless terminal 300 is the source terminal to transmit output data set 820 when divided output combining unit 226 receives divided output data piece 821 from mobile network 180. In addition, divided output data piece identifier 822 includes information to determine the combining order when divided output combining unit 226 combines divided output data piece 821.

Divided output returning unit 348 transmits divided output data piece 821 to ad-hoc network 190.

The operation of each unit is described hereinafter step by step with reference to specific data examples.

Figure 2A:
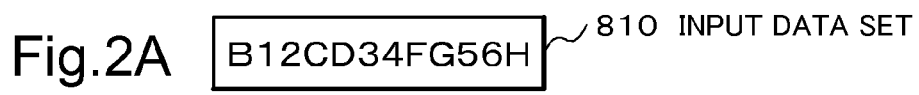
FIG. 2A to FIG. 2D are drawings showing the structures of the input data set and a divided input data piece of the first exemplary embodiment.

The first example operation shows a case where 12-byte input data set 810 shown in FIG. 2A is transmitted from computation processing management server 200 to wireless terminal 300A, previously determined as a base terminal among three wireless terminals 300. The size of the example input data set 810 is merely determined for the convenience of explanation. In actual usage, the size may be several megabytes or even larger.

Figure 2B:
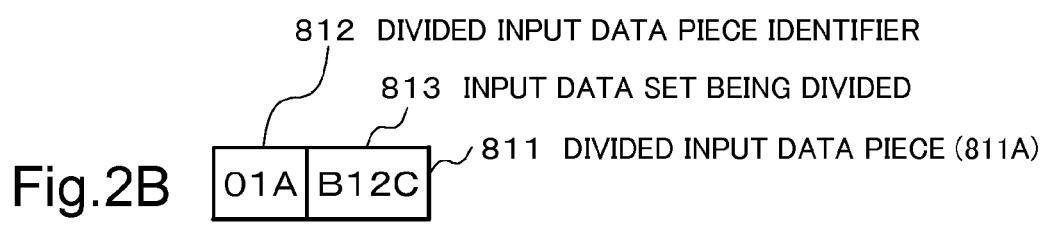
Figure 2C:
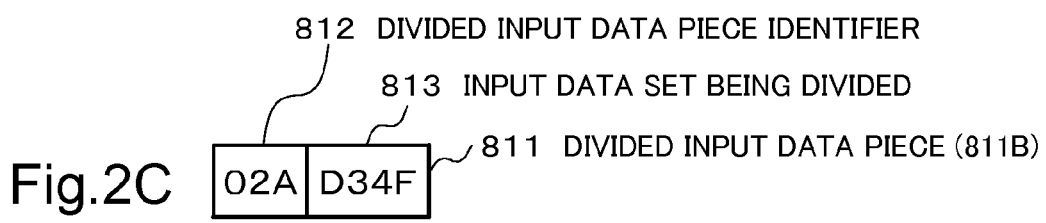
Figure 2D:
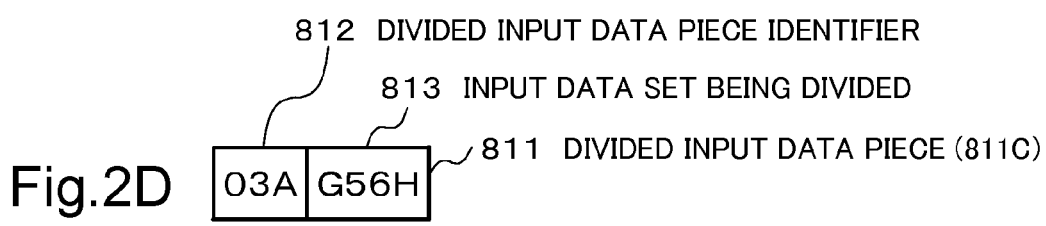

Input division unit 223 acquires input data set 810 from means that is not shown herein. Input division unit 223 then divides input data set 810 into three being the number of wireless terminals 300, and attaches divided input data piece identifier 812 to input data set being divided 813 which has been divided so that divided input data piece 811 is generated. (See FIGS. 2B, 2C and 2D.)

Divided input data piece identifier 812 includes three characters. The first two characters of divided input data piece identifier 812 indicate the combining order for the divided input data pieces 811: "01", "02" and "03" indicate that divided input data piece 811A could be combined first, divided input data piece 811B, secondly, and divided input data piece 811C, thirdly. The third character "A" of divided input data piece 811 indicates that divided input data piece 811 could be transmitted over ad-hoc network 190 to wireless terminal 300A.

Subsequently, divided input distribution unit 224 transmits divided input data piece 811C over mobile network 180 to wireless terminal 300A. Divided input distribution unit 224 then transmits divided input data piece 811A over mobile network 180 to wireless terminal 300B, previously determined as a client terminal. Divided input distribution unit 224 transmits divided input data piece 811B over mobile network 180 to wireless terminal 300C, previously determined as a client terminal.

Divided input transfer unit 332 of wireless terminal 300A receives divided input data piece 811C from mobile network 180.

Divided input transfer unit 332 of wireless terminal 300A then refers to divided input data piece identifier 812 of divided input data piece 811C. The third character of divided input data piece 812 is "A", which indicates divided input data piece 811C could be transmitted to wireless terminal 300A over ad-hoc network 190.

Here, divided input transfer unit 332 of wireless terminal 300A does not transmit divided input data piece 811C to ad-hoc network 190 but to store divided input data piece 811C in means not illustrated, since wireless terminal 300A is wireless terminal 300 to which divided input transfer unit 332 belongs.

Divided input transfer unit 332 of wireless terminal 300B receives divided input data piece 811A from mobile network 180.

Divided input transfer unit 322 of wireless terminal 300B then refers to divided input data piece identifier 812 of divided input data piece 811A. The third character of divided input data piece identifier 812 is "A", which indicates divided input data piece 811C could be transmitted to wireless terminal 300A over ad-hoc network 190. Divided input transfer unit 332 of wireless terminal 300B then transmits divided input data piece 811A to wireless terminal 300A over ad-hoc network 190.

Divided input transfer unit 332 of wireless terminal 300C operates in the same way as divided input transfer unit 332 of wireless terminal 300B, for divided input data piece 811B.

Divided input reception unit 344 of wireless terminal 300A receives divided input data piece 811A and divided input data piece 811B from ad-hoc network 190.

Divided input combining unit 345 of wireless terminal 300A refers to the first and second characters of divided input data piece identifier 812 of each of divided input data piece 811A, divided input data piece 811B and divided input data piece 811C. Divided input combining unit 345 then decides to combine divided input data piece 811A first because it has the characters "01", secondly, divided input data piece 811B because it has the characters "02", and thirdly, divided input data piece 811C because it has the characters "03".

Divided input combining unit 345 then deletes divided input data piece identifier 812 from each divided input data piece 811 to combine the data in the predetermined order. In this manner, divided input combining unit 345 of wireless terminal 300A restores input data set 810 of FIG. 2A.

According to the first example operation of the first exemplary embodiment, the impact of the communication performance of wireless terminal 300 on mobile network 180 can be distributed to the number of wireless terminals 300, when a large amount of data is transferred to particular wireless terminal 300 from computation processing management server 200.

This is achieved because the following steps are included. First, computation processing management server 200 divides input data set 810 to generate multiple divided input data pieces 811 and transmits these divided input data pieces 811 to separate wireless terminals 300 via mobile network 180. Next, each wireless terminal 300 receives divided input data piece 811 via mobile network 180 and transmits the received divided input data piece 811 to the particular wireless terminal 300 being another wireless terminal 300 via ad-hoc network 190. Then, the particular wireless terminal 300 combines divided input data pieces 811 to restore input data set 810.

Figure 3A:
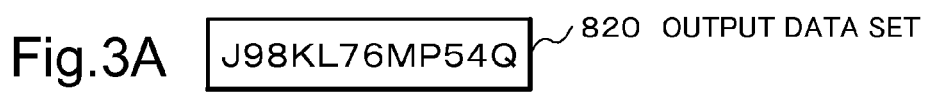
FIG. 3A to FIG. 3D are drawings showing structures of the output data set and divided output data piece of the first exemplary embodiment.

The second example operation is the case where 12-byte output data set 820 shown in FIG. 3A is transmitted to computation processing management server 200 from wireless terminal 300, previously determined as a base terminal among the three wireless terminals 300.

The size of the example output data set 820 is merely determined for the convenience of explanation. In actual usage, the size may be several megabytes or even larger.

Figure 3B:
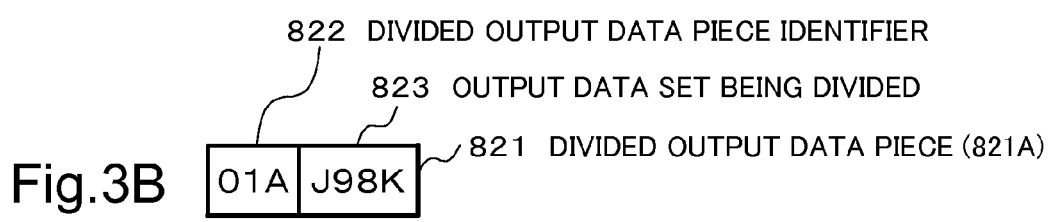
Figure 3C:
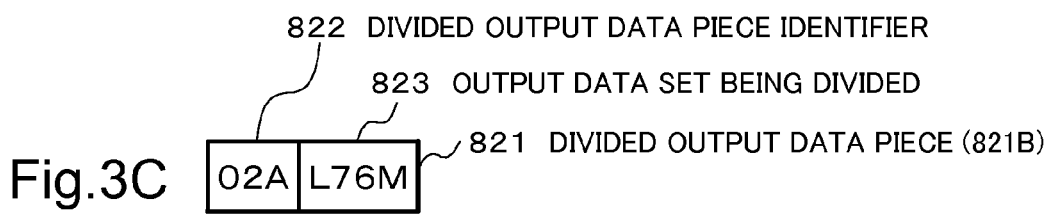
Figure 3D:
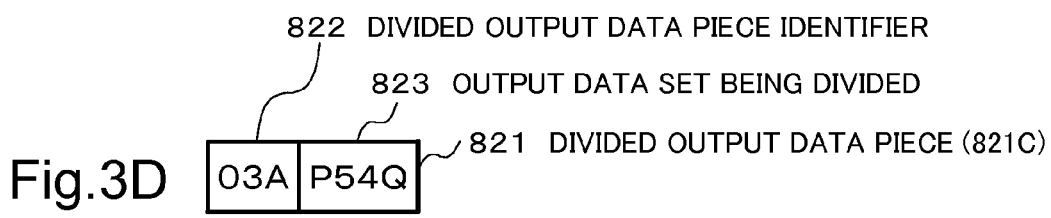

Output division unit 347 acquires output data set 820 from means that is not shown herein. Output division unit 347 then divides output data set 820 into three being the number of wireless terminals 300, and attaches divided output data piece identifier 822 to divided output data pieces 823 to generate divided output data pieces 821 (See, FIGS. 3B, 3C and 3D).

Divided output data piece identifier 822 includes three characters. The first two characters of divided output data piece identifier 822 indicate the combining order for the divided output data pieces 821: "01", "02" and "03" indicate that divided output data piece 821A could be combined first, divided output data piece 821B secondly, and divided output data piece 821C thirdly. The third character "A" of divided output data piece identifier 822 indicates that divided output data piece 821 has been transmitted to ad-hoc network 190 from wireless terminal 300A.

Divided output returning unit 348 of wireless terminal 300A then transmits divided output data piece 821A over ad-hoc network 190 to wireless terminal 300B, previously determined as a client terminal. Divided output returning unit 348 of wireless terminal 300A also transmits divided output data piece 821B over ad-hoc network 190 to wireless terminal 300C, previously determined as a client terminal.

Divided output transfer unit 339 of wireless terminal 300A then transmits divided output data piece 821C over mobile network 180 to computation processing management server 200.

Divided output transfer unit 339 of wireless terminal 300B receives divided output data piece 821A from ad-hoc network 190. Divided output transfer unit 339 of wireless terminal 300B then transmits divided output data piece 821A over mobile network 180 to computation processing management server 200.

Divided output transfer unit 339 of wireless terminal 300C operates in the same way as divided output transfer unit 339 of wireless terminal 300B, for divided output data piece 821B. Divided output reception unit 225 of computation processing management server 200 receives divided output data piece 821A, divided output data piece 821B and divided output data piece 821C from mobile network 180.

Divided output combining unit 226 of computation processing management server 200 refers to the third character of divided output data piece identifier 822 of each of divided output data piece 821A, divided output data piece 821B or divided output data piece 821C. The third character of divided output data piece identifier 822 is "A", indicating that transmission of output data set 820 is originated from wireless terminal 300A. Divided output combining unit 226 of computation processing management server 200 then identifies that divided output data piece 821C that is divided output data piece 821 originating from wireless terminal 300A, is the divided output data piece 821 that could be combined at the end.

Then, the divided output combining unit 226 of computation processing management server 200 refers to the first and second characters of divided output data piece 821C and recognizes that it is "03". Then, the divided output combining unit 226 of computation processing management server 200 refers to the first and second characters of divided output data piece identifier 822 of each of divided output data piece 821A and divided output data piece 821B. Divided output combining unit 226 then decides to combine divided output data piece 821A first because it has the characters "01", secondly, divided output data piece 821B because it has the characters "02", and thirdly, divided output data piece 821C because it has the characters "03".

Then, the divided output combining unit 226 of computation processing management server 200 deletes divided output data piece identifier 822 from each divided output data piece 821 and then combines the data pieces in the predetermined order. In this manner, divided output combining unit 226 of computation processing management server 200 restores output data set 820 of FIG. 3A.

According to the second example operation of the first exemplary embodiment, large-sized data can be distributed to computation processing management server 200 from certain wireless terminal 300 by distributing the impact of the communication performance on mobile network 180 to the number of wireless terminals 300.

This is achieved because the following steps are included. First, certain wireless terminal 300 divides output data set 820 to generate multiple divided output data pieces 821 and transmits these divided output data pieces 821 to other wireless terminals 300 via ad-hoc network 190. Next, each of the other wireless terminals 300 receives divided output data piece 821 via mobile network 180 and transmits the divided output data piece 821 to computation processing management server 200 via mobile network 180. Then, computation processing management server 200 receives and combines divided output data pieces 821 to restore output data set 820.

Described hereinafter is the first example according to the first exemplary embodiment. The operation of the first example is the same as the operation described in the first exemplary embodiment. In the first example, an effect is described by use of specific values.

Figure 4A:
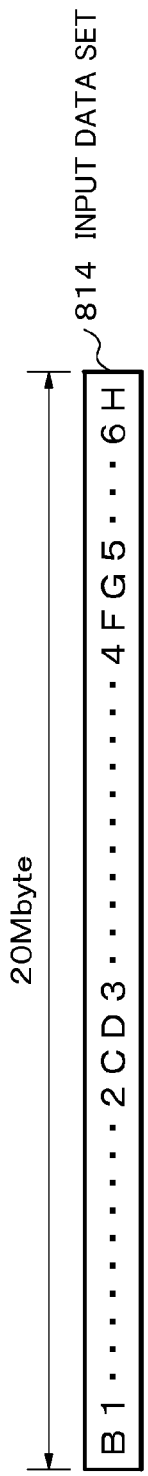
FIGS. 4A to 4D are drawings showing the structures of the input data set and a divided input data piece of the first example.

FIG. 4A shows the structure of input data set 814 as an example. For example, wireless terminal 300A, wireless terminal 300B and wireless terminal 300C correspond to wireless terminals 300 including wireless terminal identification number 621 "00001", "00002" and "00003" of FIG. 6B, respectively.

Figure 4B:
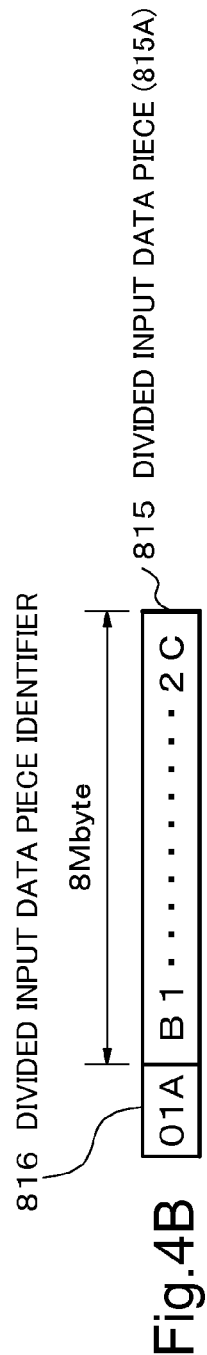
Figure 4C:
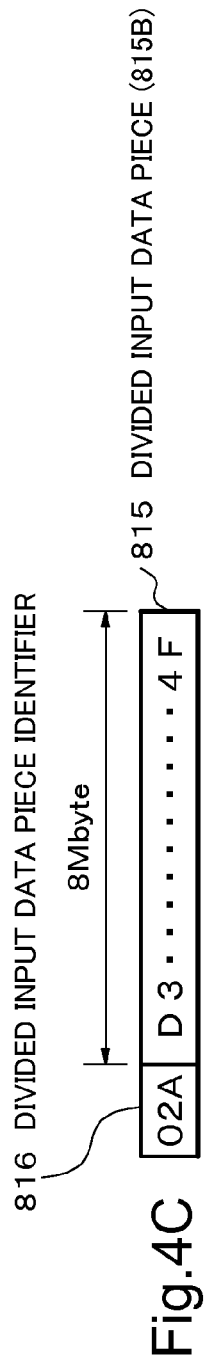
Figure 4D:
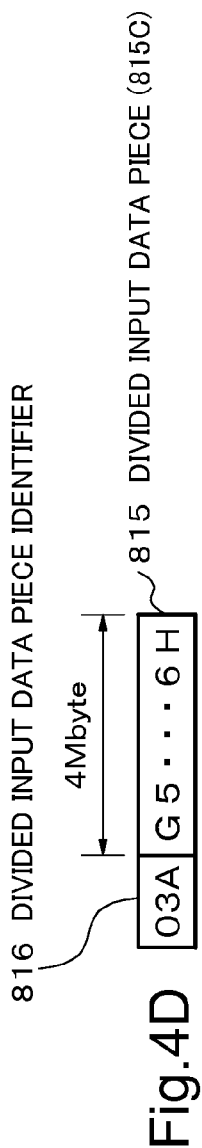

Input division unit 223 divides input data set 814 and attaches divided input data piece identifier 816 to generate divided input data piece 815A, divided input data piece 815B and divided input data piece 815C (See, FIGS. 4B, 4C and 4D).

Divided input distribution unit 224 transmits divided input data piece 815C to wireless terminal 300A, transmits divided input data piece 815A to wireless terminal 300B, and transmits divided input data piece 815B to wireless terminal 300C over mobile network 180. Described hereinafter is a method of calculating an approximate time value required for the transmission.

Assume that communication rate between computation processing management server 200 and mobile network 180 is, for example, 1 Gbps. Accordingly, the performance of transfer data from computation processing management server 200 to mobile network 180 is 100 MB/sec, for example, where 10 bits equals 1 byte. Meanwhile, the total size of the data to be transferred, which is the sum of divided input data piece 815A, divided input data piece 815B and divided input data piece 815C, is approximately 20 MB.

Therefore, the transfer time for divided input data piece 815A, divided input data piece 815B and divided input data piece 815C from computation processing management server 200 to mobile network 180 is 0.2 seconds, obtained from the following formula 1. When being transferred from computation processing management server 200 to mobile network 180, divided input data pieces 815A, divided input data piece 815B and divided input data piece 815C are transmitted in parallel at communication rates 637 of wireless terminal 300A, wireless terminal 300B and wireless terminal 300C, respectively. Note that 0.2 seconds of the transfer time required for data transfer from computation processing management server 200 to mobile network 180 will be ignored hereinafter, because the transfer time is smaller than the following transfer time by one or more digits.

$$20 \text{ MB} \div 100 \text{ MB/sec} = 0.2 \text{ sec}. \quad \text{Formula 1}$$

Assume that communication rate 637 between wireless terminal 300A and mobile network 180 is 1 Mbps with reference to the example of FIG. 6. Accordingly, the performance of transfer data from mobile network 180 to wireless terminal 300A is 100 KB/sec, for example, where 10 bits equals 1 byte. Meanwhile, the size of divided input data piece 815C to be transferred is approximately 4 MB.

Therefore, the transfer time for divided input data piece 815C from mobile network 180 to wireless terminal 300A is 40 seconds, obtained from the following formula 2:

$$4 \text{ MB} \div 100 \text{ KB/sec}. = 40 \text{ sec}. \quad \text{Formula 2}$$

Similarly, when communication rate 637 of wireless terminal 300B is 2 Mbps with reference to the example of FIG. 6, the transfer time for divided input data piece 815A from mobile network 180 to wireless terminal 300B is 40 seconds, obtained from the following formula 3:

$$8 \text{ MB} \div 200 \text{ KB/sec}. = 40 \text{ sec}. \quad \text{Formula 3}$$

Similarly, when communication rate 637 of wireless terminal 300C is 2 Mbps with reference to the example of FIG. 6, the transfer time for divided input data piece 815B from mobile network 180 to wireless terminal 300C will be 40 seconds, obtained from the following formula 4:

$$8 \text{ MB} \div 200 \text{ KB/sec}. = 40 \text{ sec}. \quad \text{Formula 4}$$

Then, divided input transfer unit 332 of wireless terminal 300B and divided input transfer unit 332 of wireless terminal 300C transfer divided input data piece 815A and divided input data piece 815B to wireless terminal 300A respectively. When ad-hoc network 190 employs, for example, BLUETOOTH, and the communication rate is 10 Mbps, the transfer time will be obtained from the following formulas 5 and 6:

$$8 \text{ MB} \div 1 \text{ MB/sec}. = 8 \text{ sec}. \quad \text{Formula 5}$$

$$8 \text{ MB} \div 1 \text{ MB/sec}. = 8 \text{ sec}. \quad \text{Formula 6}$$

Since the aim of the example is to calculate an approximate value required to determine the effect, the time required for communication unit 203 of computation processing management server 200 to output divided input data piece 815A, divided input data piece 815B and divided input data piece 815C to mobile network 180 is ignored.

This is because approximately the same amount of time is required regardless of employing the structure of the example. In addition, each process time of divided input transfer unit 332, divided input reception unit 344 and divided input combining unit 345 of wireless terminal 300 is generally only several tens of microseconds to several hundreds of milliseconds, thus can be ignored.

Also, the time consumed by protocol processing such as a session establishment is ignored. This is because approximately the same amount of time is required regardless of employing the structure of the example.

From the above, the time required, for divided input data piece 815A, divided input data piece 815B and divided input data piece 815C transmitted from computation processing management server 200, to reach wireless terminal 300A can be determined as 40 sec.+8 sec.+8 sec.=56 sec.

When the structure of the example is not employed, the transfer time for divided input data pieces 815 from computation processing management server 200 to wireless terminal 300A is 200 sec, obtained from the following formula 7:

20 MB÷100 KB/sec.=200 sec.     Formula 7

According to the first example, the effect described in the first operation example of the first exemplary embodiment can be obtained in a manner mentioned above. The second operation example of the first exemplary embodiment can be considered the same, except the data transfer direction is opposite.

Described hereinafter is a second exemplary embodiment. The descriptions that have already been mentioned in the first exemplary embodiment will be omitted to the extent that such omission of the flow will not inhibit clarity.

In the second exemplary embodiment, computation processing management server 200 distributes calculation data and a computation processing program to request computation processing, and then wireless terminals 300 return the calculated result to computation processing management server 200.

Figure 5:
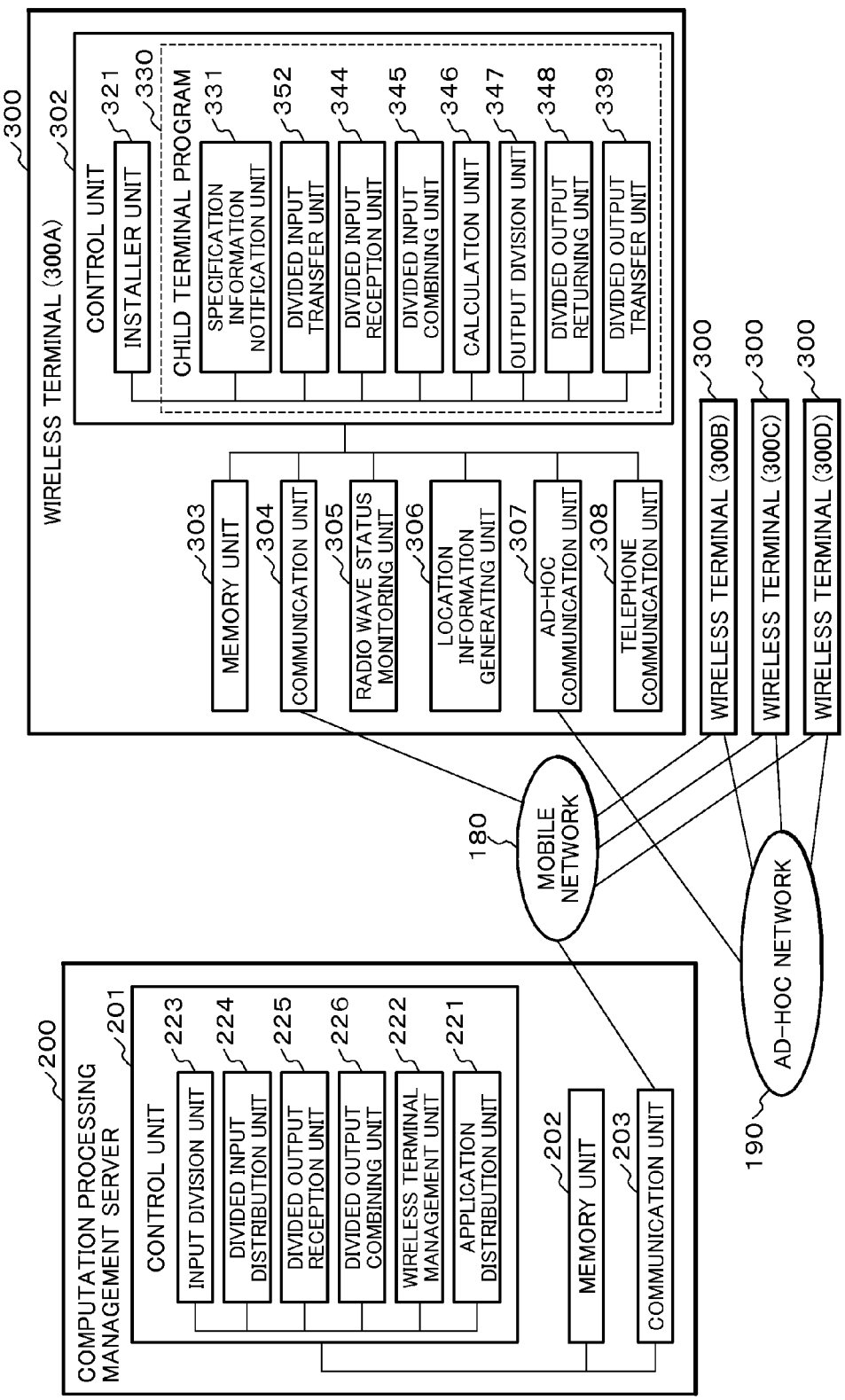
FIG. 5 is a block diagram showing the structure of the second exemplary embodiment.

With reference to FIG. 5, control unit 201 of the second exemplary embodiment additionally includes application distribution unit 221 and wireless terminal management unit 222, compared to control unit 201 of the first exemplary embodiment.

Wireless terminals 300 of the second exemplary embodiment additionally include radio wave status monitoring unit 305, location information generating unit 306 and telephone communication unit 308, compared to wireless terminals 300 of the first exemplary embodiment.

Control unit 302 of the second exemplary embodiment additionally includes installer unit 321, specification information notification unit 331 and calculation unit 246, compared to control unit 302 of the first exemplary embodiment. In addition, control unit 302 of the second exemplary embodiment includes divided input transfer unit 352, instead of divided input transfer unit 332 of the first exemplary embodiment.

Application distribution unit 221 attaches wireless terminal identification number 621, shown in FIG. 6A, to client terminal program 330 to identify wireless terminals 300. Application distribution unit 221 then distributes client terminal program 330 with attached wireless terminal identification number 621 to each wireless terminal 300.

Client terminal program 330 is installed in wireless terminals 300 to achieve each part of the exemplary embodiment required for wireless terminals 300.

Wireless terminal management unit 222 manages wireless terminal specification information 630 received from wireless terminals 300 as well as information regarding the status of wireless terminals 300. Wireless terminal specification information 630 includes wireless terminal identification number 621, device type 632, product model number 633, CPU performance 634, memory capacity 635, storage (free space/total) size 636 and communication rate 637.

The information of the status of wireless terminals 300 includes the followings: wireless terminal identification number 621, telephone OFF availability 622, terminal location 623, radio wave status 624, base terminal/client terminal 625, division block 626, computation processing completion ratio 627 and remaining processing time 628 (See, FIG. 6). Division block 626 is information which manages a group of wireless terminals 300 which process one portion of input data set 830.

Wireless terminal management unit 222 decides usage of each wireless terminal 300 based on wireless terminal specification information 630, telephone OFF availability 622, terminal location 623, and radio wave status 624, each received from wireless terminals 300.

For example, wireless terminal management unit 222 selects a base terminal from registered wireless terminals 300 based on telephone OFF availability 622, radio wave status 624, CPU performance 634, memory capacity 635 and storage (free space/total) size 636.

Wireless terminal management unit 222 then, for example, selects client terminals from registered wireless terminals 300 based on the following criteria and determines the size of divided input data piece 831 to be transmitted to each wireless terminal 300. The criteria are: location in the same "area" as the base terminal, memory capacity 635, storage (free space/total) size 636, communication rate 637, and radio wave status 624.

The decision on division block 626 and assignment of base/client terminal 625 by wireless terminal management unit 222, or the decision on the size of input data set 830 to be distributed to certain division block 626 are not necessarily implemented based only on the above mentioned information; however, for example, the algorithm to determine the usage of each wireless terminal on the basis of the computation processing priority and characteristics is not an essential part of the exemplary embodiment and thus not explained herein.

Also, the algorithm to schedule the computation processing based on computation processing completion ratio 627 and remaining processing time 628 is not an essential part of the exemplary embodiment and thus not explained herein.

Radio wave status monitoring unit 305 monitors the radio wave status of wireless terminals 300.

Location information generating unit 306 includes, for example, GPS (Global Positioning System) terminal functions to generate and maintain the location information of wireless terminals 300.

Telephone communication unit 308 controls the telephone function of wireless terminals 300.

Installer unit 432 installs client terminal program 330 received from computation processing management server 200 via mobile network 180.

The source code as a substance of client terminal program 330 is stored in memory unit 303, however, in FIG. 5, is shown in control unit 302. This means that client terminal program 330 stored in memory unit 303 is read by control unit 302 continuously to implement each function shown in FIG. 5 as the client terminal program.

Divided input reception unit 344, divided input combining unit 345, output division unit 347, divided output returning unit 348 and divided output transfer unit 339 are implemented as parts of client terminal program 330. The operations implementing the functions thereof are the same as those of already explained in the first exemplary embodiment.

Specification information notification unit 331 transmits wireless terminal specification information 630, terminal location 623 and radio wave status 624 to computation processing management server 200 via mobile network 180.

Divided input transfer unit 352 requests each of the other wireless terminals 300 to transfer divided input data piece 831 according to divided input data piece identifier 832, or transfers divided input data piece 831 to wireless terminal 300 originating the request on the basis of the request.

Calculation unit 346 inputs input data set 830 to process mathematical calculations to generate output data set 840.

Next, the operations of the second exemplary embodiment are described in detail with reference to the flow chart of FIGS. 9 and 10. Description of the operations of the second exemplary embodiment is given, starting from operations at the time point when computation processing management server 200 acquires input data set 830 to be calculated and client terminal program 330 from means not shown herein.

In computation processing management server 200, application distribution unit 221 attaches wireless terminal identification number 621 (See, FIG. 6A) to client terminal program 330 and distributes this client terminal program 330 to wireless terminals 300 (step S401).

Assume that wireless terminal identification number 621 "00001" is attached to wireless terminal 300A, wireless terminal identification number 621 "00002" to wireless terminal 300B, wireless terminal identification number 621 "00003" to wireless terminal 300C, and wireless terminal identification number 621 "00004" to wireless terminal 300D. Assume that wireless terminal identification number 621 is also attached to the other wireless terminals 300.

In the exemplary embodiment, the telephone numbers of wireless terminals 300 are managed by communication unit 203. Application distribution unit 221 or any other units within control unit 201 include no concern with the telephone numbers. Therefore, wireless terminal 300 is identified by use of wireless terminal identification number 621 between communication unit 203 and each unit of control unit 201.

The interface between communication unit 203 and each unit of control unit 201 is not an essential part of the exemplary embodiment, and thus not explained herein below.

In wireless terminals 300, installer unit 321 receives, installs and starts client terminal program 330. At the same time, installer unit 321 stores wireless terminal identification number 621 into memory unit 303 (step S402).

Then, specification information notification unit 331 collectively transmits wireless terminal identification number 621, wireless terminal specification information 630, telephone OFF availability 622, terminal location 623 and radio wave status 624, to computation processing management server 200 (step S403).

In computation processing management server 200, wireless terminal management unit 222 receives wireless terminal specification information 630, wireless terminal identification number 621, and telephone OFF availability 622, terminal location 623 and radio wave status 624. Then, wireless terminal management unit 222 stores wireless terminal specification information 630, wireless terminal identification number 621, telephone OFF availability 622, terminal location 623 and radio wave status 624 in wireless terminal specification management table 620 (step S404).

Then, wireless terminal management unit 222 selects wireless terminal 300 located within an area where ad-hoc communication is available, by referring to terminal location 623 of wireless terminals 300 (step S405).

In the example of this operation, assume that wireless terminal 300A with wireless terminal identification number 621 "00001", wireless terminal 300B with wireless terminal identification number 621 "00002" and wireless terminal 300C with wireless terminal identification number 621 "00003" are selected.

Wireless terminal management unit 222 selects wireless terminal 300 as abase terminal and wireless terminals 300 as client terminals based on wireless terminal specification information 630 of wireless terminal specification management table 620 (step S406).

In the example of this operation, wireless terminal 300A with wireless terminal identification number 621 "00001", which has the highest CPU performance, is selected as a base terminal. Then, wireless terminal 300B with wireless terminal identification number 621 "00002" and wireless terminal 300C with wireless terminal identification number 621 "00003" are selected as client terminals.

Figure 7A:
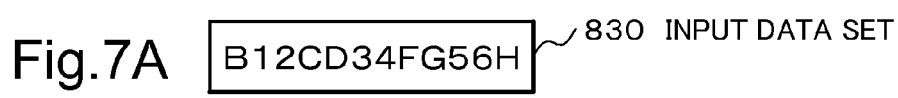
FIGS. 7A to 7D are drawings showing the structures of the input data set and a divided input data piece of the second example.
Figure 7B:
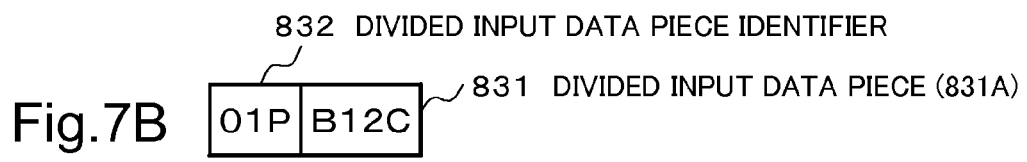
Figure 7C:
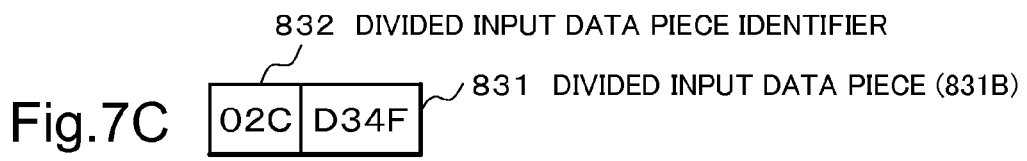
Figure 7D:
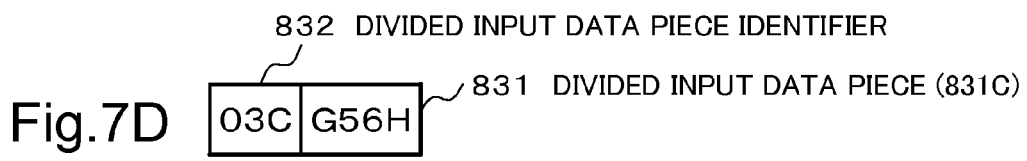

Subsequently, input division unit 223 divides input data set 830 to be computer-processed into data sets for each wireless terminal 300. For example, when 100 MB input data set is transmitted to five wireless terminals 300, input division unit 223 divides the data set into five data sets each including 20 MB data set. Input division unit 223 then attaches divided input data piece identifier 832 to the divided data sets to generate divided input data piece 831 (See, FIGS. 7B, 7C and 7D) (step S407).

Divided input data piece identifier 832 includes three characters. The first two characters of divided input data piece identifier 832, "01", "02", and "03", indicate that divided input data piece 831A could be combined first, divided input data piece 831B secondly, and divided input data piece 831C thirdly, respectively.

In a case where divided input data piece 831 is transmitted to wireless terminal 300 as a base terminal and the computation processing causes a telephone function to be turned off, "P" is assigned to the third character of divided input data piece identifier 832.

In a case of divided input data piece 831 is transmitted to wireless terminal 300 as a base terminal and the computation processing does not cause the telephone function to be turned off, "Q" is assigned to the third character of divided input data piece identifier 832.

In a case where divided input data piece 831 is transmitted to wireless terminal 300 as a client terminal, "C" is assigned to the third character of divided input data piece identifier 832.

Next, divided input distribution unit 224 transmits divided input data piece 831A to wireless terminal 300A over mobile network 180. Divided input distribution unit 224 then transmits divided input data piece 831B to wireless terminal 300B over mobile network 180. Divided input distribution unit 224 transmits divided input data piece 831C to wireless terminal 300C over mobile network 180 (step S408).

Then, in wireless terminals 300, divided input transfer unit 352 receives divided input data piece 831 (step S409).

Next, divided input transfer unit 352 of wireless terminal 300A as the base terminal requests wireless terminal 300B and wireless terminal 300C as client terminals to transfer divided input data piece 831 via ad-hoc network 190 (step S410).

Divided input transfer unit 352 of wireless terminal 300B and wireless terminal 300C as the client terminals transmit divided input data piece 831B and transfer divided input data piece 831C to wireless terminal 300A via ad-hoc network 190, respectively, in response to the request (step S411).

Divided input reception unit 344 of wireless terminal 300A receives divided input data piece 831B and divided input data piece 831C via ad-hoc network 190 (step S412).

Divided input combining unit 345 of wireless terminal 300A combines divided input data piece 831A, divided input data piece 831B and divided input data piece 831C to restore input data set 830 (step S413).

Next, calculation unit 346 of wireless terminal 300A instructs telephone communication unit 308 to turn off the telephone function. Calculation unit 346 then performs calculation processing on input data set 830 to generate output data set 840. Calculation unit 346 then instructs telephone communication unit 308 to cancel the disabling of the telephone function (step S414).

Figure 8A:
FIGS. 8A to 8D are drawings showing the structures of the output data set and divided output data piece of the second exemplary embodiment.
Figure 8B:
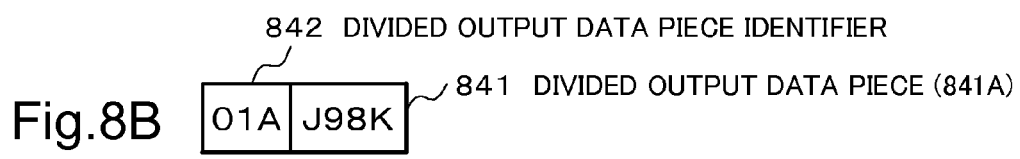
Figure 8C:
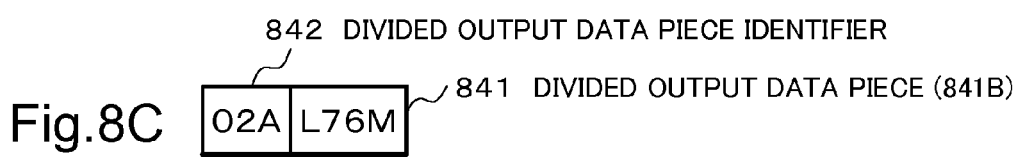
Figure 8D:
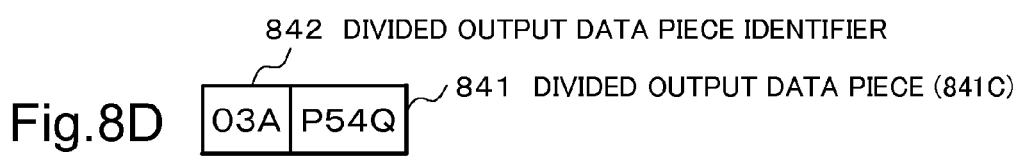

Output division unit 347 of wireless terminal 300A divides output data set 840 and attaches divided output data piece identifier 842 to generate divided output data piece 841 (See, FIGS. 8B, 8C and 8D) (step S415).

Divided output returning unit 348 of wireless terminal 300A transmits divided output data piece 841B to wireless terminal 300B over ad-hoc network 190. Divided output returning unit 348 also transmits divided output data piece 841C to wireless terminal 300C over ad-hoc network 190 (step S416).

Client wireless terminals 300B and 300C receive divided output data piece 841B and divided output data piece 841C respectively via ad-hoc network 190 (step S417).

Divided output transfer unit 339 of each wireless terminal 300 transmits divide output data set 841 to computation processing management server 200 via mobile network 180 (step S418).

In computation processing management server 200, divided input reception unit 225 receives divided output data piece 841 via mobile network 180 (step S419).

Then, divided output combining unit 226 combines divided output data piece 841A, divided output data piece 841B and divided output data piece 841C to restore output data set 840 (step S420).

Figure 11:
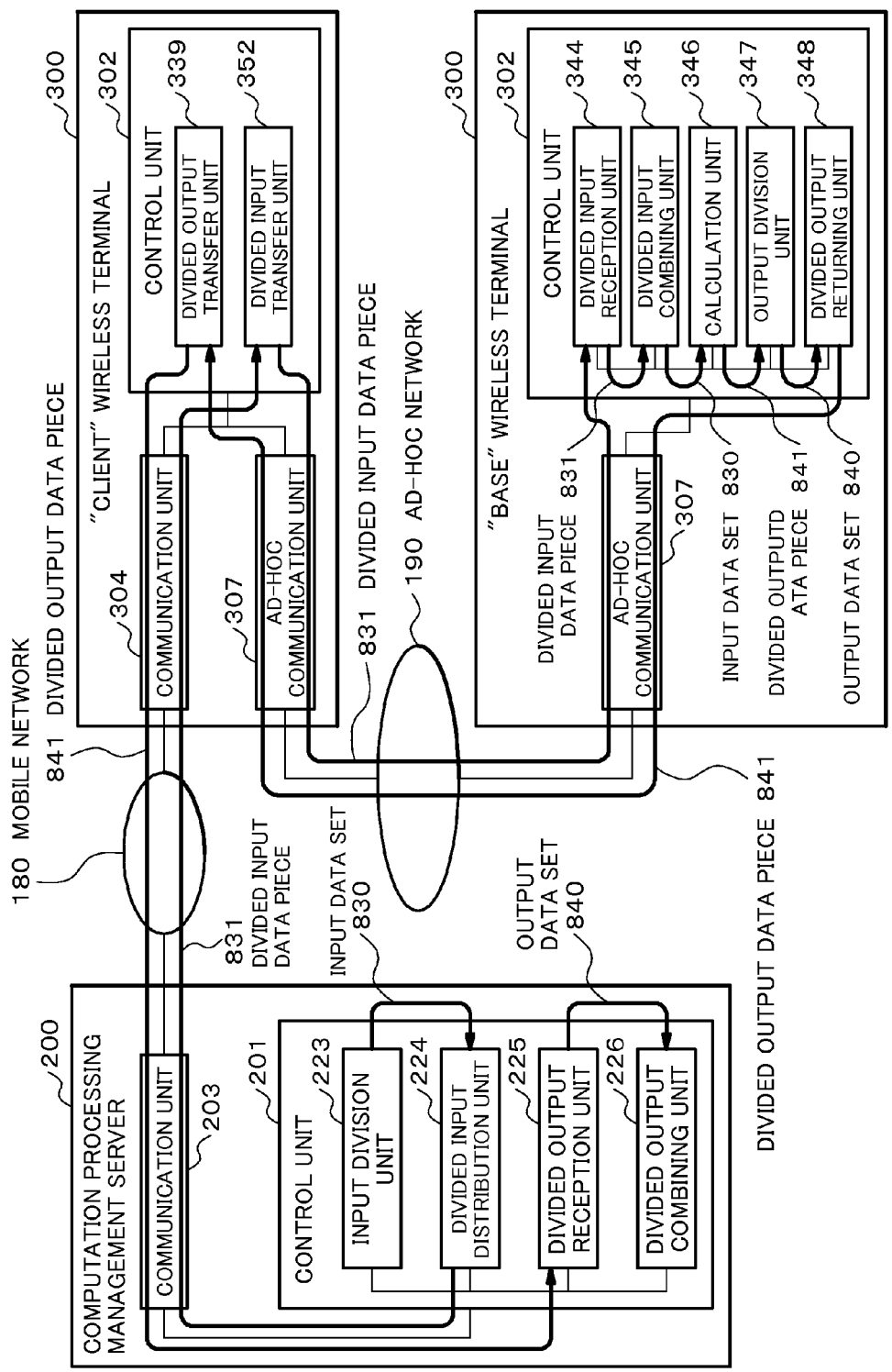
FIG. 11 is a schematic diagram showing a flow of the data of the second exemplary embodiment.

FIG. 11 is a reference diagram conceptually showing the flow of the data sets in the above mentioned operation.

The second exemplary embodiment has an effect enabling the following.

That is, large scale, high speed processing such as a simulation where a large amount of data is input and output is performed by the distributed processing by utilizing wireless terminals 300 (such as mobile phone and smartphone) which use low bandwidth and are connected to each other via mobile network 180.

This is achieved because the following steps are included. First, computation processing management server 200 divides input data set 830 into divided input data pieces 831 and transmits the data to each wireless terminal 300 using low bandwidth via mobile network 180. Then, each client wireless terminal 300 transmits divided input data piece 831 to base wireless terminal 300 via ad-hoc network 190. Base wireless terminal 300 then combines divided input data pieces 831 to restore input data set 830 to enable computation processing.

Another reason is that base wireless terminal 300 divides output data set 840 into divided output data pieces 841 and transmits divided output data pieces 841 to client wireless terminals 300 via ad-hoc network 190. Then, each wireless terminal using low bandwidth transmits divided output data piece 841 to computation processing management server 200 via mobile network 180. Computation processing management server 200 then combines divided output data pieces 841 to restore output data set 840.

Moreover, according to the second exemplary embodiment, interruption of computation processing can be avoided by operations of functions other than calculation unit 346 included in wireless terminal 300.

This is because wireless terminals 300 inform computation processing management server 200 of telephone OFF availability so that computation processing management server 200 can instruct wireless terminals 300 to turn off the telephone function.

Described hereinafter is a third exemplary embodiment. The descriptions already mentioned in the first and the second exemplary embodiments will be omitted to the extent that such omission of the flow will not inhibit clarity.

In the third exemplary embodiment, the following function is included. This function is a remedy for a possibility that communication via mobile network 180 cannot be performed due to deterioration of the radio wave status of wireless terminals 300 before wireless terminal 300 receives divided output data piece 841 after computation processing management server 200 transmits divided input data pieces 831 to wireless terminals 300.

Figure 12:
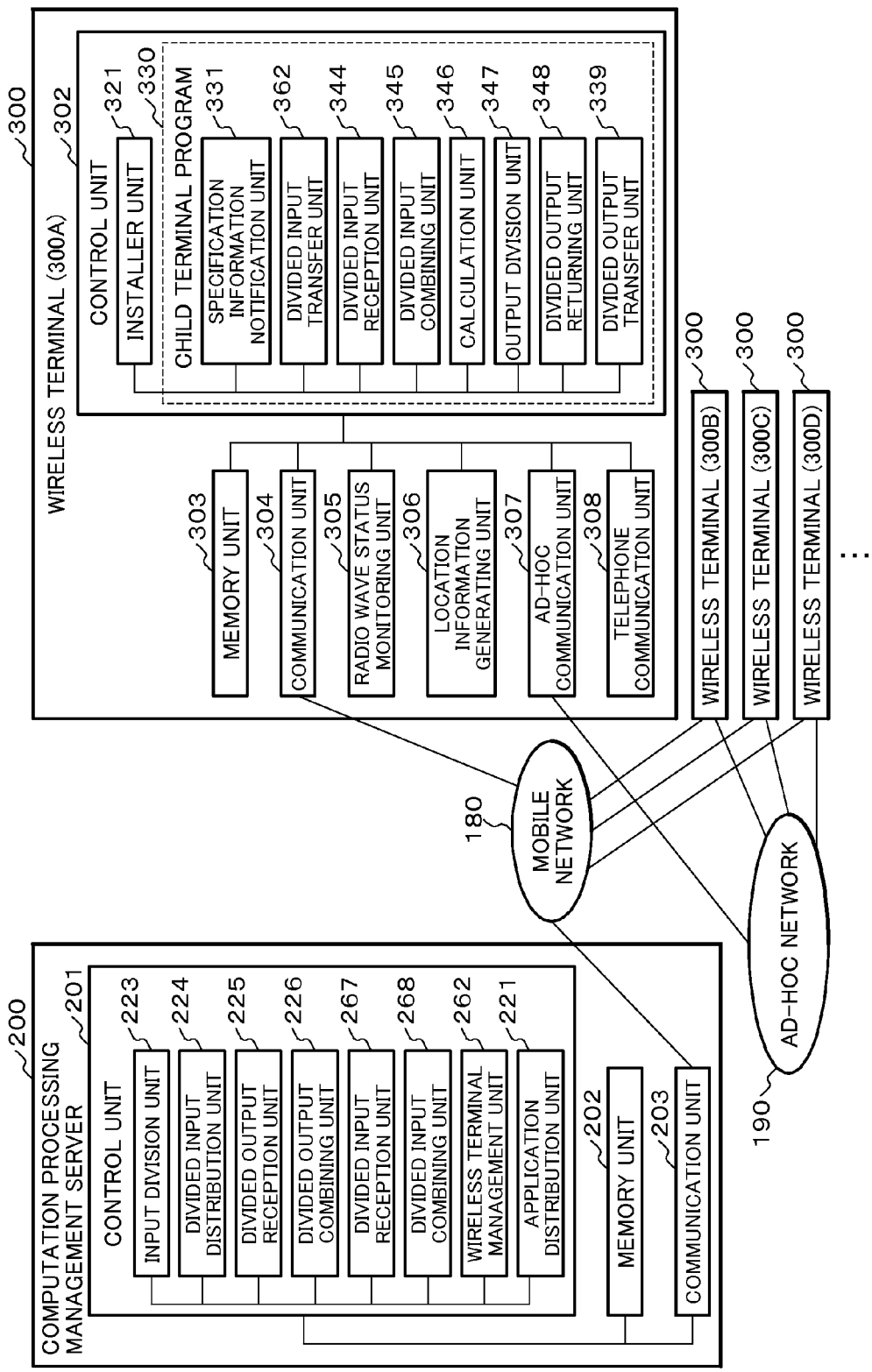
FIG. 12 is a block diagram showing the structure of the third exemplary embodiment.

With reference to FIG. 12, control unit 201 of the third exemplary embodiment additionally includes divided input reception unit 267 and divided input combining unit 268, compared to control unit 201 of the second exemplary embodiment. Furthermore, control unit 201 of the third exemplary embodiment includes wireless terminal management unit 262, instead of wireless terminal management unit 222 of the second exemplary embodiment.

Control unit 302 of wireless terminal 300 of the third exemplary embodiment includes divided input transfer unit 362, instead of divided input transfer unit 352 of the second exemplary embodiment.

Upon receiving information, from any of wireless terminals 300 via mobile network 180, indicating radio wave status deterioration, wireless terminal management unit 262 checks whether input data set 830 or all of divided input data pieces 831 are stored in memory unit 202.

Divided input reception unit 267 receives divided input data pieces 831 from mobile network 180. Divided input combining unit 268 combines divided input data pieces 831 to restore input data set 830.

Upon detecting radio wave status deterioration, radio wave status monitoring unit 305 informs computation processing management server 200 of the radio wave status deterioration via mobile network 180.

Figure 13:
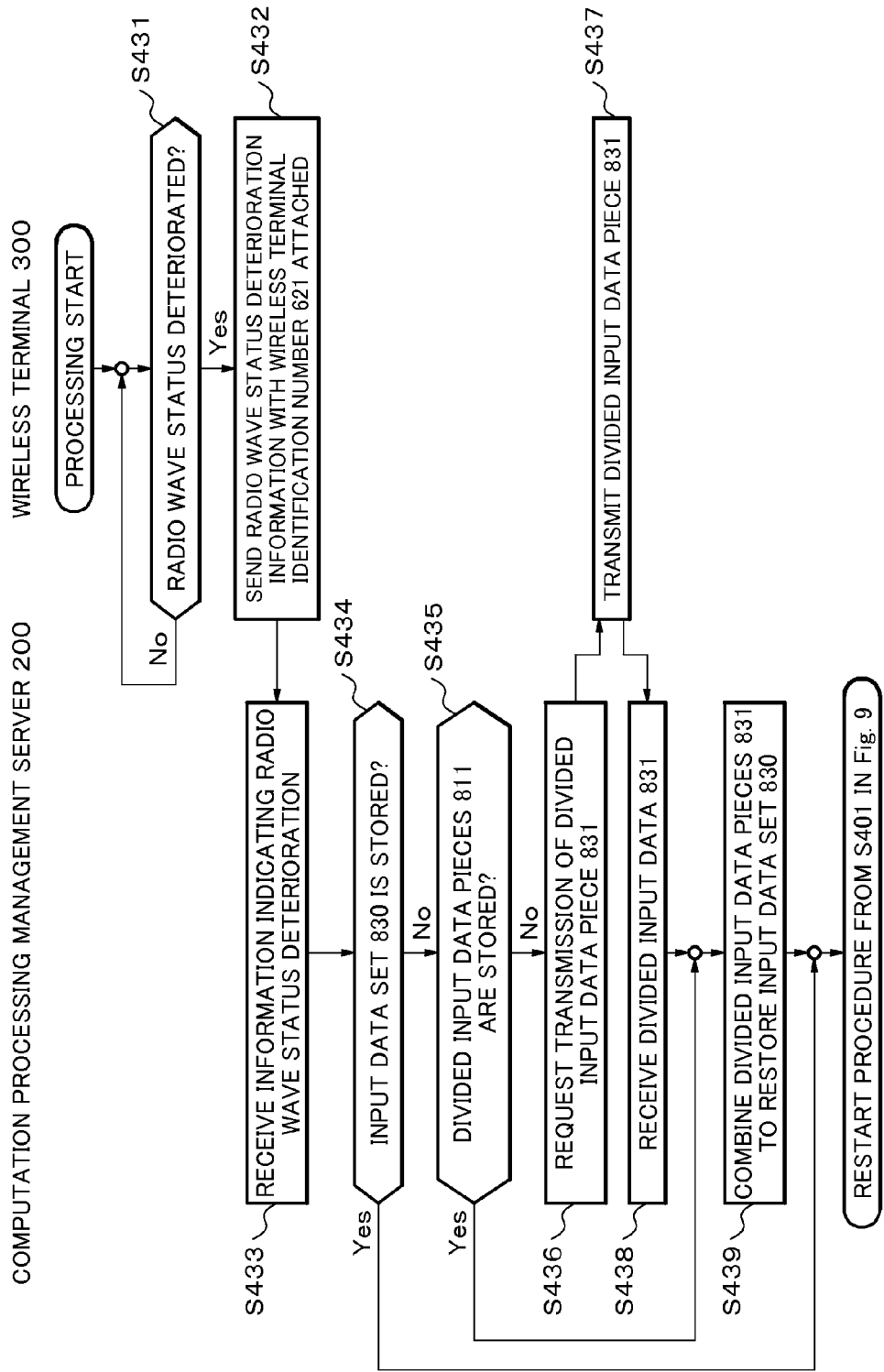
FIG. 13 is a flow chart showing the operation of the third exemplary embodiment.

Next, the operations of the third exemplary embodiment are described in detail with reference to the flow charts of FIG. 13. The described operations of the third exemplary embodiment are for a case where radio wave status deterioration occurs between steps S404 and S419 inclusive in FIG. 9 in the description of the operations of the second exemplary embodiment.

Radio wave status monitoring unit 305 of wireless terminal 300 monitors radio wave status (step 431).

Upon detecting radio wave status deterioration, radio wave status monitoring unit 305 proceeds to step S432 (when YES in step 431). When no radio wave status deterioration is detected, radio wave status monitoring unit 305 proceeds to step S431 (when NO is step 431).

Subsequently, radio wave status monitoring unit 305 attaches wireless terminal identification number 621 to information indicating radio wave status deterioration, and transmits the information indicating radio wave status deterioration to computation processing management server 200 via mobile network 180 (step S432).

Wireless terminal management unit 262 of control unit 201 of computation processing management server 200 receives the information indicating radio wave status deterioration (step S433).

Wireless terminal management unit 262 then checks whether or not input data set 830 is stored in memory unit 202 with reference to, for example, input data set status (not shown) which stores the names and storing statuses of input data sets (step S434).

Figure 9:
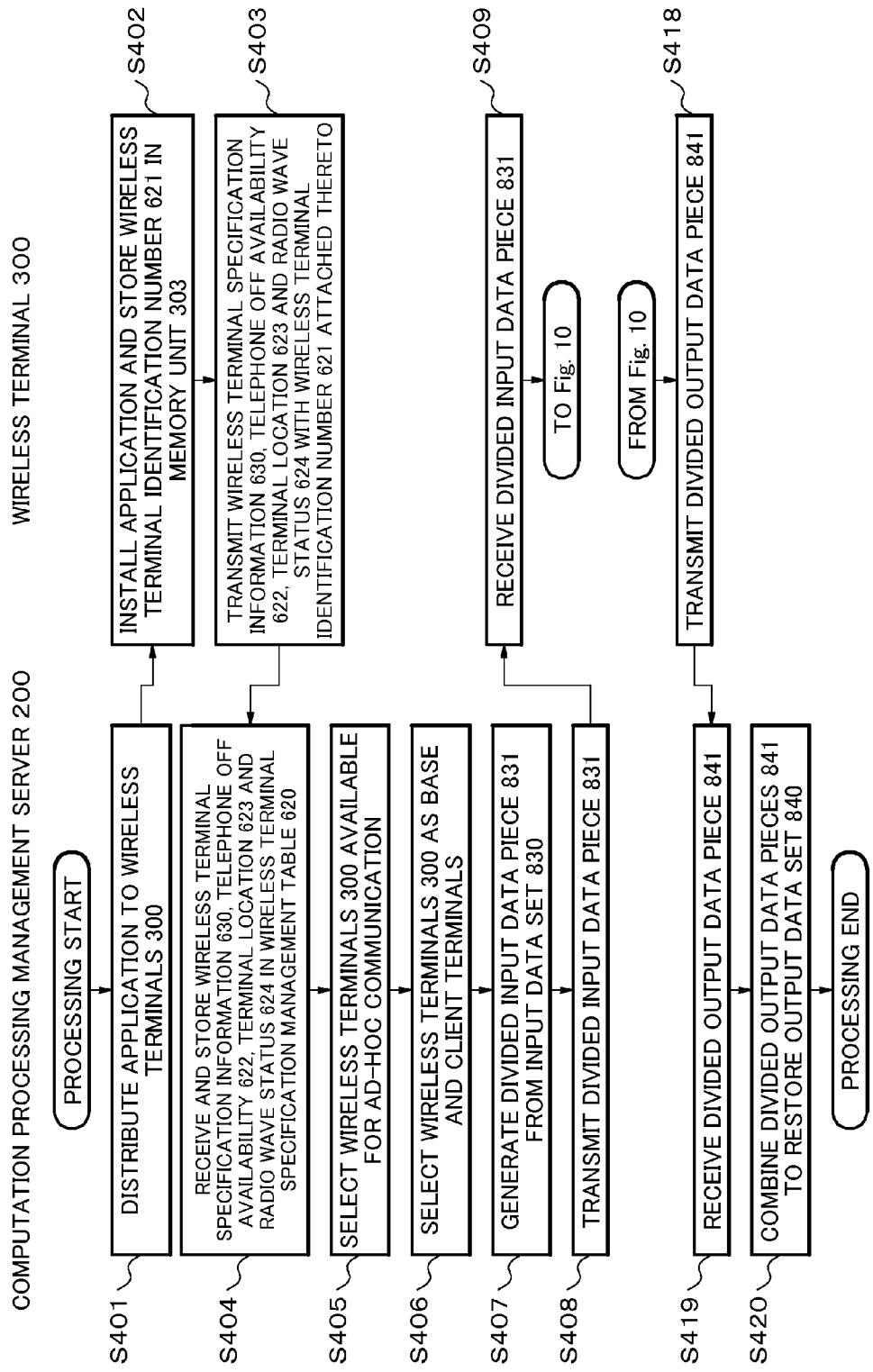
FIG. 9 is a flow chart showing the operation of the second exemplary embodiment.
Figure 10:
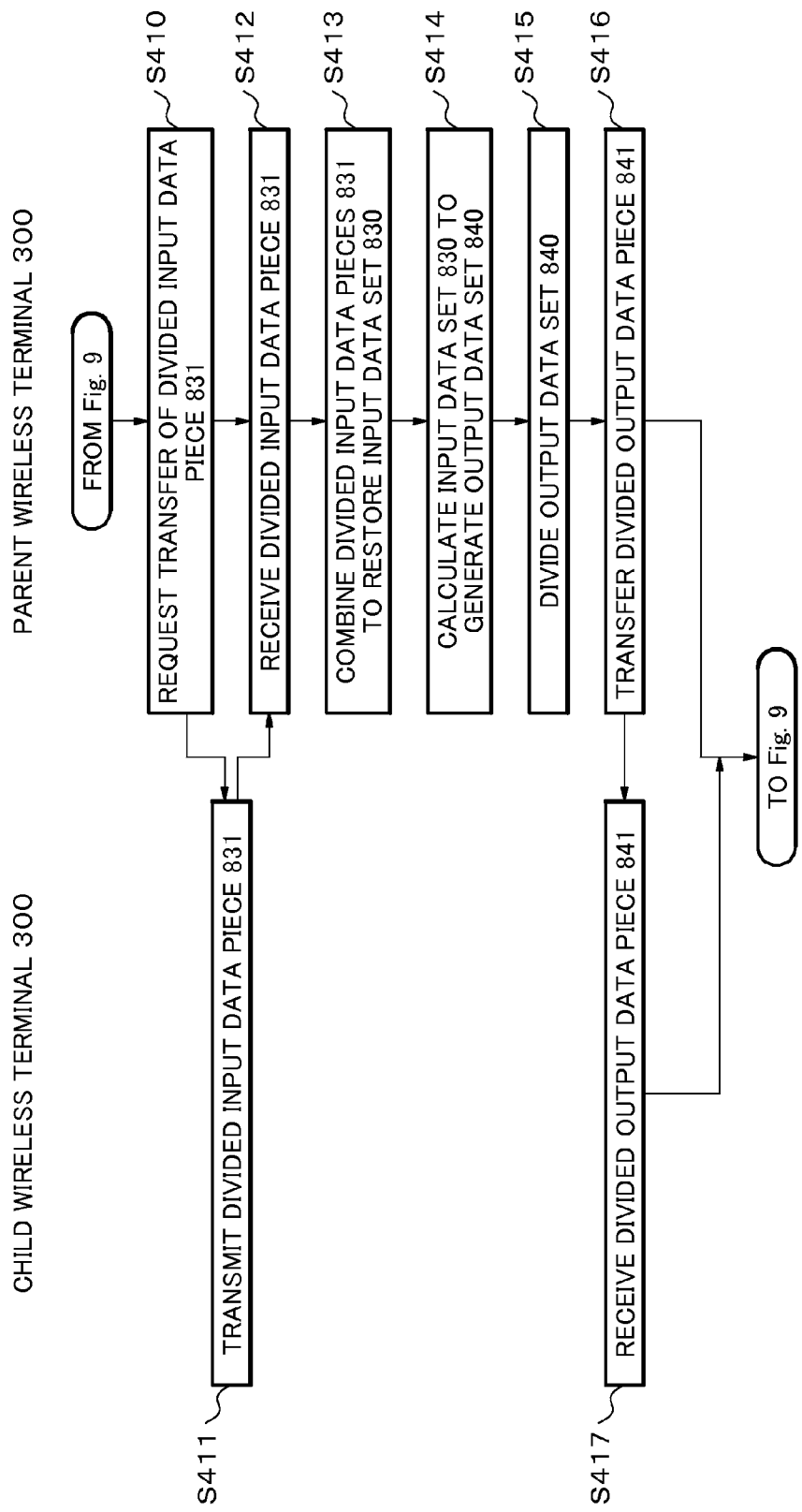
FIG. 10 is a flow chart showing the operation of the second exemplary embodiment.

Control unit 201 performs the processing again from S401 in FIG. 9 of the operations of the second exemplary embodiment, if input data set 830 is stored in memory unit 202 (YES in step S434).

Control unit 201 proceeds to step S435, if input data set 830 is not stored in memory unit 202 (NO in step S434).

Next, wireless terminal management unit 262 refers to input data set status (not shown) which stores the names and storing statuses of divided input data sets, and then checks whether or not divided input data pieces 831 for restoring input data set 830 are stored in memory unit 202 (step S435).

Control unit 201 proceeds to step S439, if divided input data piece 831 is stored in memory unit 202 (YES in step S435).

Control unit 201 proceeds to step 436 if divided input data piece 831 is not stored in memory unit 202 (NO in step S435).

Then, wireless terminal management unit 262 requests each of wireless terminals 300 to transmit divided input data piece 831 via mobile network 180 (step S436).

Divided input transfer unit 362 of control unit 302 of each of wireless terminals 300 receives the request to transmit divided input data piece 831 via mobile network 180. Divided input transfer unit 362 then transmits divided input data piece 831 via mobile network 180 (step S473).

Divided input reception unit 267 of computation processing management server 200 receives divided input data piece 831 from mobile network 180 (step S438).

Then, divided input combining unit 268 combines divided input data pieces 831 to restore input data set 830 (step S439).

Control unit 201 performs processing from S401 in FIG. 9 of the operations of the second exemplary embodiment again by using input data set 830 restored.

According to the third exemplary embodiment has an effect that, even when the radio wave status of wireless terminals 300 becomes poor and even communication is disconnected, a processing task can be moved to one of the other wireless terminals 300 smoothly.

This is because wireless terminals 300 detect radio wave status deterioration and notify computation processing management server 200 of the deterioration.

Described hereinafter is a fourth exemplary embodiment. Since the fourth exemplary embodiment partially includes the components of the first exemplary embodiment, the descriptions that have already been given in the first exemplary embodiment will be omitted to the extent that such omission of the flow will not inhibit clarity.

Figure 14:
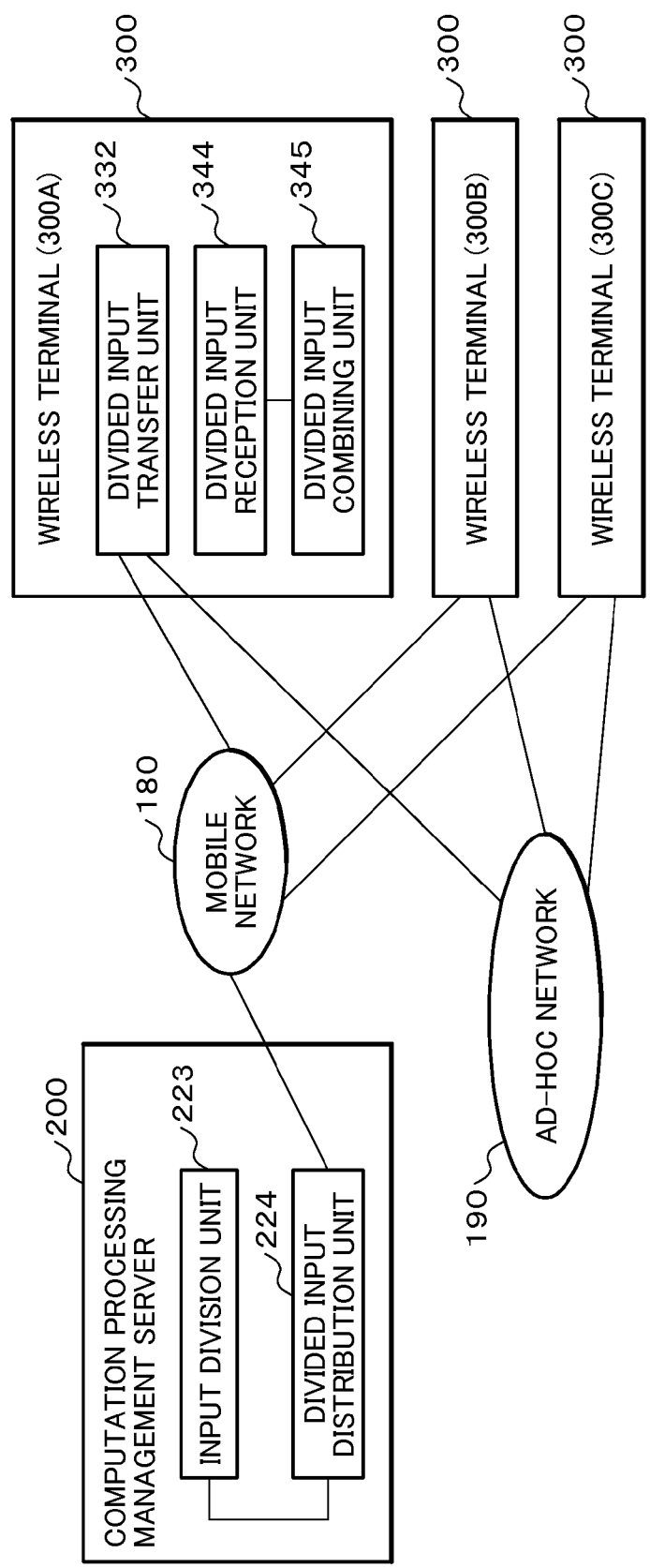
FIG. 14 is a block diagram showing the structure of the fourth exemplary embodiment.

With reference to FIG. 14, the fourth exemplary embodiment includes computation processing management server 200, wireless terminals 300, mobile network 180 and ad-hoc network 190.

Wireless terminals 300 are connected to computation processing management server 200 via mobile network 180, and connected to each other via ad-hoc network 190.

Computation processing management server 200 includes: input division unit 223 which divides input data set 810 into two or more divided input data pieces 811 with divided input data piece identifier 812 attached; and divided input distribution unit 224 which transmits divided input data pieces 811 to mobile network 180.

Wireless terminals 300 each include divided input transfer unit 332 which receives divided input data piece 811 from mobile network 180 and transmits divided input data piece 811 to ad-hoc network 190 according to divided input data piece identifier 812.

Furthermore, wireless terminals 300 each include divided input reception unit 344 which receives divided input data piece 811 from ad-hoc network 190 and divided input combining unit 345 which combines divided input data pieces 811 according to divided input data piece identifier 812.

Input data set 810, divided input data piece 811 and divided input data piece identifier 812 are the same as the ones described in the first exemplary embodiment.

According to the fourth exemplary embodiment, the impact of the communication performance of wireless terminal 300 on mobile network 180 can be distributed to multiple wireless terminals 300, when a large amount of data is transferred to particular wireless terminal 300 from computation processing management server 200.

This is achieved because particular wireless terminal 300 is capable of combining divided input data pieces 811 and restoring input data set 810. Divided input data pieces 811 have been divided from input data set 810 and transmitted to multiple wireless terminals 300 by computation processing management server 200.

Described hereinafter is a fifth exemplary embodiment. Since the fifth exemplary embodiment partially includes the components of the first exemplary embodiment, the descriptions that have already been given in the first exemplary embodiment will be omitted to the extent that such omission of the flow will not inhibit clarity.

Figure 15:
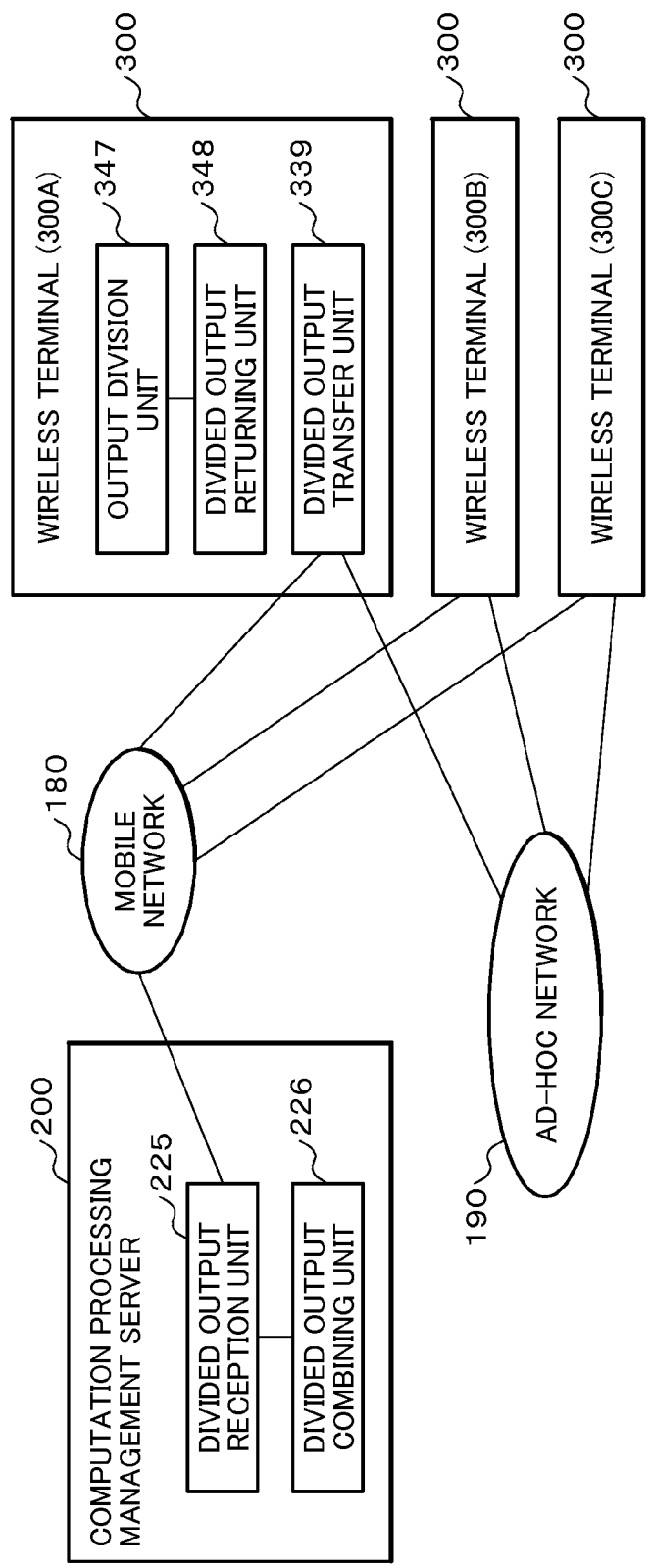
FIG. 15 is a block diagram showing the structure of the fifth exemplary embodiment.

With reference to FIG. 15, the fifth exemplary embodiment includes computation processing management server 200, wireless terminals 300, mobile network 180 and ad-hoc network 190.

Wireless terminals 300 are connected to computation processing management server 200 on mobile network 180, and connected to each other on ad-hoc network 190.

Wireless terminals 300 each include: output division unit 347 which divides output data set 820 into two or more divided output data pieces 821 with divided output data piece identifier 822 attached; and divided output returning unit 348 which transmits divided output data pieces 821 to ad-hoc network 190.

Furthermore, wireless terminals 300 each include divided output transfer unit 339 which receives divided output data piece 821 from ad-hoc network 190 and transmits divided output data piece 821 to mobile network 180.

Computation processing management server 200 includes: divided output reception unit 225 which receives divided output data pieces 821 from mobile network 180; and divided output combining unit 226 which combines divided output data pieces 821 by referring to divided output data piece identifier 822 to be described later and then restores output data set 820.

Output data set 820, divided output data piece 821 and divided output data piece identifier 822 are the same as the ones described in the first exemplary embodiment.

According to the fifth exemplary embodiment, the impact of the communication performance of wireless terminals 300 on mobile network 180 can be distributed to multiple wireless terminals 300 when a large amount of data is transferred to computation processing management server 200 from particular wireless terminal 300.

This is achieved because computation processing management server 200 is configured to be capable of restoring output data set 820 by combining divided output data pieces 821 that have been divided from output data set 820 by particular wireless terminal 300 and transmitted by multiple wireless terminals 300 to mobile network 180.

Exemplary embodiments are applicable to applications requiring large-scale high-speed processing accompanying enormous amount of calculation, such as simulation and analysis. Specifically, the applications include the following fields.

More specifically, in the field of manufacturing and construction industries, exemplary embodiments are applicable to analysis simulations of crash, drop, and the like, ranging from a large apparatus such as an airplane, a vessel and an automobile to a small one such as a mobile phone.

Exemplary embodiments are also applicable to aerodynamic analysis for an airplane and automobile as well as fluid analysis for an ink jet system for a printer and air flow of an air conditioner.

Exemplary embodiments are also applicable to deformation and stress calculation for a structure, structural analysis for an automotive frame, structural and seismic analysis for a building, and elastic analysis for parts.

In the field of semiconductor manufacturing, exemplary embodiments are also applicable to circuit designs and simulations, as well as production process simulations.

Exemplary embodiments are also applicable to creation of high-definition computer graphics images for purposes of magnetic field analysis, acoustic analysis and commercial film production.

The present invention is also applicable to meteorological forecasting.

In the field of biotechnology and chemistry, exemplary embodiments are further applicable to homology search for protein sequence, candidate search and docking simulation in drug discovery.

In the field of financial field, exemplary embodiments are further applicable to risk management, financial engineering and derivative analysis (market price calculation)

In the field of entertainment, exemplary embodiments are further applicable to creation of high-definition images including movies, games and DCC (Digital Contents Creation).

According to exemplary embodiments, large-scale mathematical operations whose processing unit size is difficult to reduce can be effectively executed by using distributed processing which utilizes terminals with a low communication rate.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A distributed processing system comprising:
a first information processing device; and
two or more second information processing devices connected with the first information processing device via a first network, the second information processing devices being connected with each other via a second network,
wherein the first information processing device includes:
an input division unit that generates two or more divided input data places by dividing an input data set to be distributed to one of the second information processing devices assigned as a base terminal;
a divided input distribution unit that transmits the divided input data places to the second information processing devices via the first network;
a divided input transfer unit that receives the divided input data piece via the first network and transmits the divided input data piece via the second network to the second information processing device assigned as the base terminal;
a divided input reception unit that receives the divided input data piece from one or more of the second information processing devices assigned as a client terminal via the second network; and
a divided input combining unit that combines the divided input data pieces to restore the input data set; and
wherein the divided input transfer unit of the second information processing devices assigned as the base terminal instructs the second information processing devices assigned as the client terminal to transmit the divided input data pieces via the second network to the second information processing device assigned as the base terminal.

2. The distributed processing system according to claim 1, wherein the second information processing device assigned as the base terminal further includes:
a calculation unit that calculates the restored input data set by a pre-determined computation processing method to generate the output data set.

3. The distributed processing system according to claim 2, wherein the first information processing device further includes:
a first control unit including
the input division unit,
the divided input distribution unit,
the divided output combining unit, and
the divided output reception unit;
a first memory unit that is used by the first control unit to write and read information; and
a first communication unit that is used by the first control unit to access the first network; and
wherein each of the second information processing devices further includes:
a second control unit including
the divided input transfer unit,
the divided input reception unit,
the divided input combining unit,
the divided output returning unit,
the divided output transfer unit,
the output division unit, and
the calculation unit;
a second memory unit in order for the second control unit to write and read information;
a second communication unit in order for the second control unit to access the first network; and
an ad-hoc communication unit in order for the second control unit to access the second network.

4. The distributed processing system according to claim 1, wherein the calculation unit outputs an instruction to stop a pre-determined function among functions included in the second information processing devices.

5. The distributed processing system according to claim 1, wherein the first information processing device further includes:
a wireless terminal management unit that requests each of the second information processing devices to transmit the divided input data piece via the first network;
a divided input reception unit that receives the divided input data pieces via the first network; and
a divided input combining unit that combines the divided input data pieces to restore the input data set,
wherein the divided input transfer unit of each of the second information processing devices transmits, in response to the request, the divided input data piece to the first information processing device via the first network.

6. The distributed processing system according to claim 5, wherein each of the second information processing devices further includes:
a specification information notification unit that transmits the specification information of the second information processing device to the first information processing device via the first network.

7. The distributed processing system according to claim 1, wherein the first information processing device further includes:
a wireless terminal management unit that assigns each of the second information processing devices as the base terminal or client terminal based on specification information of the second information processing device.

8. The distributed processing system according to claim 1, wherein each of the second information processing devices further includes:
a location information generating unit that generates the location information of the second information processing device; and
a specification information notification unit that transmits the location information to the second information processing device via the first network.

9. The distributed processing system according to claim 8, wherein each of the second information processing devices further includes:
a radio wave monitoring unit that monitors the radio wave status of the second information processing device; and
a specification information notification unit that transmits the radio wave status information to the first information processing device via the first network.

10. A distributed processing method comprising:
a first information processing device; and
two or more second information processing devices connected with the first information processing device via a first network, the second information processing devices being connected with each other via a second network,
wherein the first information processing device includes:
an input division unit that generates two or more divided input data places by dividing an input data set to be distributed to one of the second information processing devices assigned as a base terminal;
a divided input distribution unit that transmits the divided input data places to the second information processing devices via the first network;
a divided input transfer unit that receives the divided input data piece via the first network and transmits the divided input data piece via the second network to the second information processing device assigned as the base terminal;
a divided input reception unit that receives the divided input data piece from one or more of the second information processing devices assigned as a client terminal via the second network; and
a divided input combining unit that combines the divided input data pieces to restore the input data set; and
the second information processing device assigned as the base terminal transmitting the divided input data pieces via the second network to the second information processing devices assigned as the client terminal.

11. The distributed processing method according to claim 10, further comprising:
the second information processing device assigned as the base terminal calculating the restored input data set by a pre-determined computation processing method to generate the output data set.

12. The distributed processing method according to claim 10, further comprising:
the first information processing device:
requesting each of the second information processing devices to transmit the divided input data piece via the first network;
receiving the divided input data piece via the first network; and
combining the divided input data pieces to restore the input data set; and
each of the second information processing devices:
transmitting, in response to the request, the divided input data piece to the first information processing device via the first network.

13. The distributed processing method according to claim 10, further comprising:
the first information processing device:
assigning each of the second information processing devices as the base terminal or client terminal, based on specification information of the second information processing device.

14. The distributed processing method according to claim 10, further comprising
each of the second information processing devices:
transmitting the location information of the second information processing device to the first information processing device via the first network.

15. The distributed processing method according to claim 10, further comprising
the first information processing device:
assigning each of the second information processing devices as the base terminal or client terminal, based on radio wave status of the second information processing device.

16. A distributed processing method comprising:
a first information processing device:
assigning each of a plurality of second information processing devices located within a second area where a second network is available as a base terminal or a client terminal, based on location information of the second information processing device, wherein the plurality of second information processing devices are connected with the first information processing device via a first network and are connected with each other via the second network;
one of the plurality of second information processing devices:
generating two or more divided output data pieces by dividing output data set, and
transmitting the divided output data pieces via the second network to one or more of the second information processing devices assigned as a client terminal; and
one or more of the second information processing devices:
receiving the divided output data piece from the second information processing device assigned as the base terminal via a second network and
transmitting the divided output data piece via the first network;
a first information processing device:
receiving the divided output data pieces from the second information processing devices via the first network,
combining the two or more divided output data pieces to restore the output data set; and:
each of the second information processing devices stopping a pre-determined function among functions included in the second information processing devices during execution of the computation processing.

17. The distributed processing method according to claim 16, further comprising:
  each of the second information processing devices:
  transmitting the specification information of the second information processing device to the first information processing device via the first network.

18. The distributed processing method according to claim 17 further comprising
  each of the second information processing devices:
  transmitting the radio wave status of the second information processing device to the first information processing device via the first network.

19. A distributed processing system comprising:
  a first information processing means; and
  two or more second information processing means connected with the first information processing means via a first network, the second information processing means being connected with each other via a second network;
  wherein the first information processing means includes:
    an input division means for generating two or more divided input data pieces by dividing an input data set to be distributed to one of the second information processing means assigned as the base terminal; and
    a divided input distribution means for transmitting the divided input data pieces to the second information processing means via the first network;
  wherein the second information processing means includes:
    a divided input transfer means for receiving the divided input data piece via the first network and for transmitting the divided input data piece via the second network to the second information processing means assigned as the base terminal,
    a divided input reception means for receiving the divided input data piece from one or more of the second information processing means assigned as a client terminal via the second network;
    a divided input combining means for combining the divided input data pieces to restore the input data set; and
  wherein the divided input transfer means of the second information processing means assigned as the base terminal instructs the second information processing means assigned as the client terminal to transmit the divided input data pieces via the second network to the second information processing means assigned as the base terminal.

* * * * *